United States Patent
Shah et al.

(10) Patent No.: US 7,947,640 B2
(45) Date of Patent: *May 24, 2011

(54) METHOD OF NEUTRALIZING A STAIN ON A SURFACE

(75) Inventors: Ketan N. Shah, Gurnee, IL (US); James F. Kimball, Greenfield, WI (US); Marcia L. Santaga, Waterford, WI (US); Eric J. Minor, Lake Villa, IL (US)

(73) Assignee: S.C. Johnson & Son, Inc., Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/799,805

(22) Filed: May 3, 2007

(65) Prior Publication Data

US 2007/0277848 A1 Dec. 6, 2007

Related U.S. Application Data

(62) Division of application No. 11/447,787, filed on Jun. 6, 2006.

(60) Provisional application No. 60/687,953, filed on Jun. 7, 2005.

(51) Int. Cl.
*C11D 3/00* (2006.01)

(52) U.S. Cl. ........ 510/278; 510/242; 510/404; 510/438; 427/210; 427/292; 523/409

(58) Field of Classification Search ........ 8/142; 428/96; 510/278, 329, 101, 242, 404, 438; 524/366, 524/423; 134/7; 424/401; 427/292; 523/409
See application file for complete search history.

(56) References Cited

U.S. PATENT DOCUMENTS 1,256,189 A 2/1918 Wilson
(Continued)

FOREIGN PATENT DOCUMENTS

CA CN 2211589 * 2/1999
(Continued)

OTHER PUBLICATIONS

International Search Report and Written Opinion dated Jul. 20, 2007 for PCT/US2006/021848.

(Continued)

*Primary Examiner* — Mark Kopec
*Assistant Examiner* — Khanh Tuan Nguyen

(57) ABSTRACT

Compositions, methods, apparatuses, kits, and combinations are described for neutralizing a stain on a surface. The compositions useful in the present disclosure include a composition that is formulated to be applied and affixed to a surface. If desired, the composition may be substantially removed from the surface to remove a portion or substantially all of the stain before being affixed to the surface. If a user desires to remove the composition from the surface, the composition is formulated to be removed by a number of methods including, for example, vacuuming, wet extraction, chemical application, and the like. If the user desires to affix the composition to the surface in a permanent or semi-permanent manner, the composition may be affixed to the surface by applying energy thereto in the form of, for example, heat, pressure, emitted waves, an emitted electrical field, a magnetic field, and/or a chemical. The compositions may also be utilized in the form of a kit or in conjunction with a design device, such as a stencil, to control the application of the composition to create, for example, a pattern on the surface.

16 Claims, 2 Drawing Sheets

U.S. PATENT DOCUMENTS

| | | | |
|---|---|---|---|
| 3,030,227 A | 4/1962 | Clifford et al. | |
| 3,595,166 A | 7/1971 | Sherman | |
| 3,716,330 A | 2/1973 | Kitamura et al. | |
| 3,723,323 A | 3/1973 | Morgan et al. | |
| 3,910,848 A * | 10/1975 | Froehlich et al. | 510/329 |
| 3,929,068 A | 12/1975 | Budden | |
| 3,956,162 A * | 5/1976 | Lautenberger | 510/404 |
| 3,956,197 A * | 5/1976 | Schoenholz et al. | 510/438 |
| 4,006,273 A * | 2/1977 | Wolinski et al. | 427/278 |
| 4,013,594 A * | 3/1977 | Froehlich et al. | 510/278 |
| 4,046,505 A | 9/1977 | Cobb et al. | |
| 4,085,159 A | 4/1978 | Marsiat | |
| 4,089,722 A | 5/1978 | Holoubek | |
| 4,123,378 A | 10/1978 | Abel et al. | |
| 4,131,422 A | 12/1978 | Thomas et al. | |
| 4,140,728 A | 2/1979 | Hahn et al. | |
| 4,147,737 A | 4/1979 | Sein et al. | |
| 4,180,527 A | 12/1979 | Schmid et al. | |
| 4,195,140 A | 3/1980 | Sexsmith et al. | |
| 4,239,490 A | 12/1980 | Kelly et al. | |
| 4,243,565 A * | 1/1981 | Nishino et al. | 523/409 |
| 4,397,650 A | 8/1983 | Gregorian et al. | |
| 4,434,067 A * | 2/1984 | Malone et al. | 510/278 |
| 4,471,108 A | 9/1984 | Belder et al. | |
| 4,560,604 A | 12/1985 | Shimiza et al. | |
| 4,568,606 A | 2/1986 | Hart et al. | |
| 4,604,308 A | 8/1986 | Widmer et al. | |
| 4,659,494 A * | 4/1987 | Soldanski et al. | 8/142 |
| 4,681,791 A | 7/1987 | Shibahashi et al. | |
| 4,693,840 A * | 9/1987 | Trinh et al. | 510/242 |
| 4,713,084 A | 12/1987 | Bohrn et al. | |
| 4,764,395 A | 8/1988 | Felder et al. | |
| 4,778,742 A | 10/1988 | Ong et al. | |
| 4,782,672 A | 11/1988 | Secolo | |
| 4,834,900 A * | 5/1989 | Soldanski et al. | 8/142 |
| 4,836,828 A | 6/1989 | Hussamy | |
| 4,871,604 A * | 10/1989 | Hackler | 428/96 |
| 4,913,952 A | 4/1990 | Fowler | |
| 4,960,433 A | 10/1990 | Renton | |
| 4,965,172 A | 10/1990 | Matrick | |
| 4,978,390 A | 12/1990 | Snedeker | |
| 4,981,488 A | 1/1991 | Cates et al. | |
| 4,990,369 A | 2/1991 | Burchill et al. | |
| 5,010,131 A | 4/1991 | Wagner | |
| 5,037,485 A * | 8/1991 | Chromecek et al. | 134/7 |
| 5,041,488 A | 8/1991 | Meades | |
| 5,047,261 A | 9/1991 | Moussa et al. | |
| 5,057,392 A | 10/1991 | McCabe et al. | |
| 5,064,443 A | 11/1991 | Ricci | |
| 5,071,440 A | 12/1991 | Hines et al. | |
| 5,091,213 A | 2/1992 | Silbermann et al. | |
| 5,091,257 A | 2/1992 | Nonogaki et al. | |
| 5,110,317 A | 5/1992 | Hangey et al. | |
| 5,110,625 A | 5/1992 | Burchill et al. | |
| 5,110,626 A | 5/1992 | Burchill et al. | |
| 5,110,634 A | 5/1992 | Silbermann et al. | |
| 5,112,715 A | 5/1992 | DeMejo et al. | |
| 5,112,883 A | 5/1992 | Gallas | |
| 5,122,404 A | 6/1992 | Fowler | |
| 5,126,191 A | 6/1992 | Fourezon | |
| 5,131,914 A | 7/1992 | Kelley | |
| 5,131,918 A | 7/1992 | Kelley | |
| 5,143,754 A | 9/1992 | Long et al. | |
| 5,147,747 A | 9/1992 | Wilson et al. | |
| 5,164,226 A | 11/1992 | Burchill et al. | |
| 5,176,745 A | 1/1993 | Moore et al. | |
| 5,193,457 A | 3/1993 | Hahn | |
| 5,199,957 A | 4/1993 | Pascoe | |
| 5,217,255 A | 6/1993 | Lin et al. | |
| 5,230,708 A | 7/1993 | Hangey et al. | |
| 5,232,535 A | 8/1993 | Brinley | |
| 5,238,465 A | 8/1993 | Fritzsche | |
| 5,242,994 A | 9/1993 | Nield et al. | |
| 5,250,634 A | 10/1993 | Toyoda et al. | |
| 5,252,379 A | 10/1993 | Kuribayashi et al. | |
| 5,258,471 A | 11/1993 | Nield et al. | |
| 5,262,510 A | 11/1993 | Kwon et al. | |
| 5,284,902 A | 2/1994 | Huber et al. | |
| 5,302,223 A | 4/1994 | Hale | |
| 5,321,063 A | 6/1994 | Shimada et al. | |
| 5,355,793 A | 10/1994 | Sato | |
| 5,362,417 A | 11/1994 | Ziolo | |
| 5,379,947 A | 1/1995 | Williams et al. | |
| 5,453,459 A | 9/1995 | Roberts | |
| 5,456,725 A | 10/1995 | Bruhnke | |
| 5,460,881 A | 10/1995 | Hsu | |
| 5,466,527 A | 11/1995 | Jenkins | |
| 5,472,764 A | 12/1995 | Kehr et al. | |
| 5,525,125 A | 6/1996 | Cole et al. | |
| 5,536,762 A | 7/1996 | Hinojosa | |
| 5,571,444 A | 11/1996 | Fisher et al. | |
| 5,575,877 A | 11/1996 | Hale et al. | |
| 5,578,245 A | 11/1996 | Ziolo | |
| 5,585,426 A * | 12/1996 | Williams et al. | 524/366 |
| 5,587,408 A | 12/1996 | Burns et al. | |
| 5,589,256 A | 12/1996 | Hansen et al. | |
| 5,601,023 A | 2/1997 | Hale et al. | |
| 5,603,735 A | 2/1997 | Zimin, Sr. et al. | |
| 5,626,634 A | 5/1997 | Goldmann et al. | |
| 5,637,654 A | 6/1997 | Panandiker et al. | |
| 5,640,180 A | 6/1997 | Hale et al. | |
| 5,646,240 A | 7/1997 | Oishi et al. | |
| 5,674,923 A | 10/1997 | Subbaraman et al. | |
| 5,681,620 A | 10/1997 | Elgarhy | |
| 5,708,039 A | 1/1998 | Daly et al. | |
| 5,721,052 A * | 2/1998 | Muthiah et al. | 428/413 |
| 5,734,396 A | 3/1998 | Hale et al. | |
| 5,763,016 A | 6/1998 | Levenson et al. | |
| 5,800,866 A | 9/1998 | Myers et al. | |
| 5,851,595 A | 12/1998 | Jones, Jr. | |
| 5,852,072 A | 12/1998 | Banning et al. | |
| 5,869,172 A | 2/1999 | Caldwell | |
| 5,872,090 A | 2/1999 | You et al. | |
| 5,876,792 A | 3/1999 | Caldwell | |
| 5,908,663 A | 6/1999 | Wang et al. | |
| 5,919,858 A | 7/1999 | Loftin | |
| 5,922,088 A | 7/1999 | Cole et al. | |
| 5,929,145 A | 7/1999 | Higgins et al. | |
| 5,955,413 A | 9/1999 | Campagna et al. | |
| 5,955,523 A | 9/1999 | Stephens et al. | |
| 5,958,547 A | 9/1999 | Fukunishi et al. | |
| 5,981,021 A | 11/1999 | McCulloch | |
| 5,989,638 A | 11/1999 | Nielsen | |
| 6,007,955 A | 12/1999 | Verhecken et al. | |
| 6,024,770 A | 2/2000 | De Lathauwer | |
| 6,032,576 A | 3/2000 | Collins | |
| 6,036,726 A | 3/2000 | Yang et al. | |
| 6,040,359 A | 3/2000 | Santini et al. | |
| 6,069,221 A | 5/2000 | Chasser et al. | |
| 6,073,554 A | 6/2000 | Cutcher, Sr. | |
| 6,090,447 A | 7/2000 | Suzuki et al. | |
| 6,121,408 A | 9/2000 | Aoki et al. | |
| 6,136,046 A | 10/2000 | Fukunishi et al. | |
| 6,147,041 A | 11/2000 | Takahaski et al. | |
| 6,207,768 B1 | 3/2001 | Sato et al. | |
| 6,211,308 B1 | 4/2001 | Saint Victor | |
| 6,214,898 B1 | 4/2001 | Barrio et al. | |
| 6,251,987 B1 | 6/2001 | Sacripante et al. | |
| 6,254,995 B1 | 7/2001 | Kohno et al. | |
| 6,284,845 B1 | 9/2001 | Panandiker et al. | |
| 6,294,610 B1 | 9/2001 | Daly et al. | |
| 6,306,930 B1 | 10/2001 | Tsujio | |
| 6,341,856 B1 | 1/2002 | Thompson et al. | |
| 6,348,679 B1 | 2/2002 | Ryan et al. | |
| 6,348,939 B1 | 2/2002 | Xu et al. | |
| 6,352,563 B1 | 3/2002 | Kusaki et al. | |
| 6,358,461 B1 | 3/2002 | Law et al. | |
| 6,391,061 B1 | 5/2002 | Hortel et al. | |
| 6,407,048 B1 | 6/2002 | Grippaudo et al. | |
| 6,443,996 B1 | 9/2002 | Mihelich et al. | |
| 6,458,192 B1 | 10/2002 | Tsujio | |
| 6,488,719 B2 | 12/2002 | Lomasney et al. | |
| 6,497,936 B1 | 12/2002 | Desai et al. | |
| 6,506,221 B1 | 1/2003 | Macholdt et al. | |
| 6,506,445 B2 | 1/2003 | Popat et al. | |
| 6,509,555 B1 | 1/2003 | Reiss et al. | |
| 6,533,824 B1 | 3/2003 | Roper | |

| | | |
|---|---|---|
| 6,539,856 B2 | 4/2003 | Jones et al. |
| 6,585,369 B1 | 7/2003 | Sievert et al. |
| 6,589,294 B2 | 7/2003 | Hortel et al. |
| 6,593,401 B1 | 7/2003 | Park et al. |
| 6,600,142 B2 | 7/2003 | Ryan et al. |
| 6,602,566 B2 | 8/2003 | Steenbergen |
| 6,618,066 B2 | 9/2003 | Hale et al. |
| 6,645,569 B2 | 11/2003 | Cramer et al. |
| 6,649,317 B2 | 11/2003 | Wagner et al. |
| 6,649,888 B2 | 11/2003 | Ryan et al. |
| 6,653,265 B2 | 11/2003 | Rossi et al. |
| 6,673,503 B2 | 1/2004 | Wagner et al. |
| 6,686,314 B2 | 2/2004 | Xu et al. |
| 6,703,089 B2 | 3/2004 | DeProspero et al. |
| 6,719,467 B2 | 4/2004 | Hess et al. |
| 6,723,413 B2 | 4/2004 | Walters |
| 6,723,428 B1 | 4/2004 | Foss et al. |
| 6,770,285 B2* | 8/2004 | Keenan et al. ............... 424/401 |
| 6,779,443 B2 | 8/2004 | Martinez et al. |
| 6,790,819 B2 | 9/2004 | Trinh et al. |
| 6,841,244 B2 | 1/2005 | Foss et al. |
| 6,849,370 B2 | 2/2005 | Wagner et al. |
| 6,863,933 B2 | 3/2005 | Cramer et al. |
| 6,872,443 B2 | 3/2005 | Franke |
| 6,872,444 B2 | 3/2005 | McDonald et al. |
| 6,887,640 B2 | 5/2005 | Zhang et al. |
| 6,887,916 B2 | 5/2005 | Zhou et al. |
| 6,890,974 B2 | 5/2005 | Park et al. |
| 6,893,662 B2 | 5/2005 | Dittmar et al. |
| 6,894,090 B2 | 5/2005 | Shinzo et al. |
| 6,916,774 B2 | 7/2005 | Trinh et al. |
| 6,927,253 B2 | 8/2005 | Lassmann et al. |
| 6,936,075 B2 | 8/2005 | Vogt et al. |
| 6,951,670 B2 | 10/2005 | Stroppiana |
| 6,977,098 B2 | 12/2005 | Gurer et al. |
| 6,977,111 B2 | 12/2005 | Yamaguchi et al. |
| 6,992,028 B2 | 1/2006 | Thomaschefsky et al. |
| 7,008,889 B2 | 3/2006 | Black et al. |
| 7,018,429 B1 | 3/2006 | Wenstrup |
| 7,022,377 B2 | 4/2006 | Kanada et al. |
| 7,041,424 B2 | 5/2006 | Xu et al. |
| 7,066,993 B2 | 6/2006 | Wuzik et al. |
| 7,108,728 B2 | 9/2006 | Sunamori et al. |
| 7,112,621 B2 | 9/2006 | Rohrbaugh et al. |
| 7,186,450 B2 | 3/2007 | Foxon |
| 7,264,861 B2 | 9/2007 | Zafiroglu et al. |
| 7,279,212 B2 | 10/2007 | Foxon |
| 7,423,002 B2 | 9/2008 | Shah et al. |
| 7,556,841 B2* | 7/2009 | Kimball et al. ............... 427/292 |
| 2001/0051222 A1 | 12/2001 | Stevenson et al. |
| 2002/0040503 A1 | 4/2002 | Pace et al. |
| 2002/0046433 A1 | 4/2002 | Sellman, Jr. et al. |
| 2003/0092589 A1* | 5/2003 | Todini et al. ............... 510/278 |
| 2003/0134114 A1 | 7/2003 | Pallotta et al. |
| 2003/0157377 A1 | 8/2003 | Muthiah |
| 2003/0194560 A1 | 10/2003 | Spera et al. |
| 2004/0076788 A1 | 4/2004 | Steinhardt et al. |
| 2004/0118305 A1 | 6/2004 | Martinez et al. |
| 2004/0154106 A1 | 8/2004 | Oles et al. |
| 2004/0177452 A1 | 9/2004 | Donaldson et al. |
| 2004/0180230 A1 | 9/2004 | Muthiah |
| 2004/0200564 A1 | 10/2004 | Kinsey et al. |
| 2004/0230008 A1 | 11/2004 | Correll et al. |
| 2005/0004291 A1* | 1/2005 | Grimm et al. ............... 524/423 |
| 2005/0089540 A1 | 4/2005 | Uchiyama et al. |
| 2005/0090627 A1 | 4/2005 | Wenning et al. |
| 2005/0095933 A1 | 5/2005 | Kimbrell et al. |
| 2005/0123743 A1 | 6/2005 | Martinazzo |
| 2005/0155693 A1 | 7/2005 | Zafiroglu |
| 2005/0187124 A1* | 8/2005 | Li et al. ............... 510/278 |
| 2005/0199152 A1 | 9/2005 | Hale et al. |
| 2006/0051571 A1 | 3/2006 | Steinhardt et al. |
| 2006/0134384 A1 | 6/2006 | Vinson et al. |
| 2006/0135668 A1 | 6/2006 | Hayes |
| 2006/0165979 A1 | 7/2006 | Kinsey et al. |
| 2006/0276360 A1 | 12/2006 | Muradov |
| 2007/0054819 A1* | 3/2007 | Li et al. ............... 510/101 |
| 2007/0082171 A1 | 4/2007 | Fulton |
| 2007/0232179 A1 | 10/2007 | Polat et al. |
| 2007/0270064 A1 | 11/2007 | Aseere |
| 2007/0275207 A1 | 11/2007 | Higgins et al. |
| 2007/0286982 A1 | 12/2007 | Higgins et al. |
| 2008/0131647 A1 | 6/2008 | Shimizu et al. |

FOREIGN PATENT DOCUMENTS

| | | |
|---|---|---|
| DE | 10224984 A1 | 12/2003 |
| EP | 0 103 407 | 8/1986 |
| EP | 0 103 344 | 10/1988 |
| EP | 0 569 921 | 11/1993 |
| EP | 0 752 498 | 1/1997 |
| EP | 0 803 351 | 10/1997 |
| EP | 0 993 876 | 4/2000 |
| EP | 1 132 439 | 9/2001 |
| EP | 1283296 A1 | 12/2003 |
| GB | 669739 | 4/1952 |
| GB | 669739 A | 4/1952 |
| GB | 1461049 A | 1/1977 |
| JP | 01111081 A | 4/1989 |
| WO | 02064679 A1 | 8/2002 |
| WO | WO 2004/066793 | 1/2004 |

OTHER PUBLICATIONS www.coloryourcarpet.com, Home Page (3 pages).

Non-final Office action, dated Apr. 9, 2009, for U.S. Appl. No. 11/447,694, filed Jun. 6, 2006.

Non-Final Office Action dated Aug. 10, 2009 for U.S. Appl. No. 12/317,633, filed Dec. 23, 2008.

Non-Final Rejection issued on Mar. 1, 2010 (U.S. Appl. No. 11/447,439, filed Jun. 6, 2006).

Non-Final Rejection issued on Sep. 16, 2009 (U.S. Appl. No. 11/447,439, filed Jun. 6, 2006).

Final Rejection issued on Jan. 28, 2010 (U.S. Appl. No. 12/491,000, filed Jun. 6, 2009).

Non-Final Rejection issued on Sep. 16, 2009 (U.S. Appl. No. 12/491,000, filed Jun. 6, 2009).

Non-final Office action, dated Apr. 16, 2009, for U.S. Appl. No. 11/447,439, filed Jun. 6, 2006.

Rohm and Haas. MSDS Acrylic Binder for Textile and Nonwoven Applications, Apr. 6, 2009.

* cited by examiner

METHOD OF NEUTRALIZING A STAIN ON A SURFACE

CROSS REFERENCE TO RELATED APPLICATIONS

This application is a divisional of U.S. patent application Ser. No. 11/447,787, filed Jun. 6, 2006, and also claims the benefit of U.S. Provisional Application Ser. No. 60/687,953, filed Jun. 7, 2005, both of which are hereby incorporated herein by reference in their entirety.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

Enhancement of surfaces that may be initially cleaned and subsequently permanently or temporarily re-colored is disclosed herein.

2. Description of the Background of the Invention

Improving the aesthetics in homes has long been practiced by many consumers. There is a plethora of home products and techniques for cleaning surface areas of soft surfaces such as carpets, rugs, draperies, curtains, upholstery, and the like. However, for more sullied and/or worn surfaces, subtractive processes (for example, a process that chemically or physically removes something from the carpet, such as cleaning or shaving) cannot truly restore the surface to its original state; this is often very frustrating for consumers. Oftentimes, spots and stains reappear after treatment.

Additive processes (for example, a process that layers, covers, or masks something undesirable underneath) and techniques for improving the aesthetics of surfaces include painting, faux painting, stenciling, bordering, wallpapering, tiling, wainscoting, paneling, decorative plastering, adding appliqués (for example, pictures, cut-outs, stickers, or the like), laminating, and molding (for example, crown, shoe, and chair) are known. However, the aforementioned subtractive and additive products and techniques have seldom been combined and applied to surfaces such as carpets, rugs, draperies, curtains, upholstery, and the like.

In one instance, stain removing assistant compositions that contain 15 to 35% anionic surfactants, optionally 3-25% by weight of a water-insoluble alcohol, 3-25% by weight of pine oil, and 30-73% by weight of water are used in combined cleaning and dyeing of natural or synthetic textile materials and hard or soft surfaces. The cleaning and dyeing process can be performed in a single- or two-stage process.

In another instance, a method for spot dyeing nylon carpet includes bleaching a stained area of a nylon carpet and then applying separately and in sequence primary color acid dyes in aqueous solutions to the bleached area to match the color to the surrounding color of the carpet. The bleached areas to be treated are first subjected to rinse and extraction steps and a subsequent bleach neutralizing step to remove the bleach.

SUMMARY OF THE INVENTION

According to one aspect of the present disclosure, a method of neutralizing a stain on a surface includes applying an effective amount of a composition to a selected surface to affect a color change thereon. The composition includes a liquid carrier and at least one of a polymer or a resin. The method further includes allowing the composition to substantially dry on the surface to form substantially dry particles greater than about 1 micron in size attached to the surface. The composition is formulated to neutralize a stain on the surface by at least one of substantially removing the composition from the surface, or applying energy to the composition to substantially affix the composition to the surface.

According to another aspect of the present disclosure, a kit for neutralizing a stain on a surface includes a composition including a liquid carrier and at least one of a polymer or a resin, a design device including a barrier layer, an absorbent material, and a solid support layer for securement to a surface, and an optional set of instructions. The composition is formulated to substantially dry on a surface to form substantially dry particles greater than about 1 micron in size attached thereto and to neutralize a stain on the surface by substantially removing the dry particles from the surface. The composition is also formulated to neutralize a stain on the surface by applying energy to affix the composition to the surface.

According to a further aspect of the present disclosure, a method of neutralizing a stain on a surface includes applying a consumer aid to a surface, selecting a composition that is formulated to remove a stain material from the surface and to be substantially affixed to the surface by at least one of chemical curing or mechanical bonding, applying the composition to the surface, and allowing the composition to substantially dry on the surface to form a substantially dry particle greater than about 1 micron in size attached thereto. The substantially dry particle can be at least one of substantially removed from the surface to substantially remove the stain material from the surface or substantially affixed thereto to substantially mask the stain material on the surface.

According to yet another aspect of the present disclosure, a composition for neutralizing a stain on a surface includes at least one substantially homogeneous particle including a resin and at least one of a curative or an accelerant, a first additive, and a liquid carrier. The composition is formulated to substantially dry on a surface to form substantially dry particles of the composition greater than about 1 micron in size attached to the surface. Further, the dry particles can be substantially affixed to the surface by the application of energy to the substantially dry particles. The substantially dry particles can be substantially removed from the surface before the dry particles are substantially affixed thereto.

DETAILED DESCRIPTION OF THE PREFERRED EMBODIMENTS

Figures 1, 2:
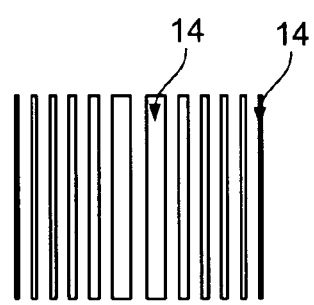
FIG. 1 is a plan view of a design device for use with application of a composition according to one embodiment.
FIG. 2 is cross-sectional view taken generally along the lines 2-2 of the design device of FIG. 1.

The present disclosure is directed to compositions, methods, apparatuses, kits, and combinations, for neutralizing stains on a surface. While several specific embodiments are discussed herein, it is understood that the present disclosure is to be considered only as an exemplification of the principles of the invention, and it is not intended to limit the disclosure to the embodiments illustrated.

For example, a composition useful in the present disclosure is formulated to be applied and affixed to a surface. As discussed more fully below, the composition may be initially applied to the surface and substantially removed from the surface to neutralize a stain. A subsequent application of the composition to any residual stain material may be substantially affixed thereto to hide and/or mask the residual stain material. To remove the composition prior to affixation, the composition is formulated to be removed by a number of methods including, for example, vacuuming, wet extraction, chemical application, and the like. If the user desires to affix the composition to the surface in a permanent or semi-permanent manner to hide and/or mask a residual stain or surface blemish, the composition may be affixed to the surface by applying energy in the form of, for example, heat, pressure, emitted waves, an emitted electrical field, a magnetic field, and/or a chemical. The composition may also be supplied in the form of a kit or applied in conjunction with a design device, such as a stencil, to control the application of the composition to the surface.

Any surface is contemplated to which the composition may be applied and/or affixed, including, for example, soft surfaces such as carpets, rugs, draperies, curtains, upholstery, and the like. In addition, the composition may be applied to hard surfaces as well, including, for example, wood, metal, ceramic, glass, a polymer, a hard floor tile, a painted surface, paper, masonry material, rock, a fiber/composite material, rubber, concrete, and the like. It is contemplated that the composition may be applied to any prepared surface, including, for example, pre-dyed, post-dyed, pre-manufactured and post-manufactured surfaces. Further, the composition may be applied during the manufacturing process of a particular good or object that includes a surface in which the composition may be applied. Surfaces to which the composition may be applied and/or affixed may be substantially dry, substantially wet, moist or humid depending on the particular composition utilized. Further, a composition of the present disclosure may be applied to a substantially flat, smooth, and/or level surface or any other surface including rough, bumpy, non-smooth, stepped, sloped, slanted, inclined, declined, and/or disturbed surfaces.

Examples of carpets to which the composition may be applied and/or affixed thereto include modular tiles and panels such as Milliken LEGATO®, Milliken TESSERAE®, INTERFACEFLOR™, Tandus/C&A Floorcovering, and from manufacturers such as Mohawk and Shaw. Additional examples of carpets include broadloom carpets, cut pile (velvet/plush, Saxony, frieze, shag), loop pile (level loop, multi-level loop, and Berber), and cut and loop pile (random sheared and tip sheared) carpets. Additional examples of soft surfaces on which a composition of the present disclosure may be useful include, for example, area rugs (hand woven or machine woven), draperies, curtains, upholstery, and cellulosic materials, among others. Constituent materials of candidate soft surfaces include, for example, natural fibers such as wool and cotton, or synthetic fibers such as nylon 6, nylon 6-6, polyester, polypropylene (olefin), and acrylic, among others.

Compositions of the present disclosure may be formulated, designed, produced, manufactured, applied, removed, and/or packaged by any formulaic, chemical, and/or physical preparation appropriate for the specific embodiment desired, as would only be limited by the inherent nature of the constituent ingredients. Illustrative formulations of the compositions include a solid that may be dissolved or dispersed in a liquid to make a liquid-based composition, a liquid carrier, an emulsion, a suspension, a colloid, a sol, a dispersion, a solution, a gel, a paste, a foam, a powder, a spray, a tablet, a solid, a gas, a diluent such as water or other solvent, an aerosol, and combinations thereof. Examples of chemical preparations include polyester polymerizations, latex aggregation, chemical milling, and microencapsulization, and other methods known to those skilled in the art. Physical preparation may consist of physically grinding the composition ingredients or other means known to those skilled in the art. Compositions may be either synthesized from a molecular route, in which polymer resin molecules incorporate colorants, dyes, and/or pigment particles at the molecular scale, such as in the method of manufacture used in chemically prepared toners, or the resin and pigment particles may be physically blended together and crushed to appropriate size by mechanical means known to those skilled in the art.

The composition may be chosen based on any number of criteria, including, but not limited to the surface type, condition, and/or composition to which the composition is applied and/or affixed. Further criteria for choosing a composition include desired lightfastness, color range, intensity, uniformity of colorant, and/or desired curative and/or fixation properties of the composition. Additional choice factors include enhancement of the appearance and/or feel of the carpet or other surface, masking a stain, or value adding to a surface (for example, to extend the life of a carpet by restoring the carpet to an acceptable appearance).

A composition useful in the present disclosure may comprise any one or combination of colorants that include, for example, a coloring agent, a dye, an ink, a toner, a paint, a patch, a fluorescent material, a particle, a coating, a pigment, a luminescent material, a microparticle, a magnetically responsive particle, a virtual colorant which is not colored until activated, an additive, and combinations thereof. Illustratively, a composition contains a colorant in an amount of greater than about 0.01% or less than about 95%, or between about 0.01% to about 70%, or between about 0.03% to about 15%, or about 0.05% to about 10%, or between about 0.1% to about 5%, of the total weight of the particle. Other illustrative compositions useful in the present invention include those disclosed in U.S. Pat. No. 7,556,841, U.S. Ser. No. 11/447,694, and U.S. Ser. No. 11/447,439, the disclosures of which are herein incorporated by reference in their entireties.

Any imaginable color of the composition is contemplated in the present disclosure including, but not limited to cyan, yellow, magenta, black, green, orange, violet, blue, red, purple, white, silver, gold, beige, metallic, clear, neutral, or non-neutral, and any combination thereof. Color may be imparted to the composition by combining varying amounts of monochromic composition particles of different colors or by combining varying amounts of polychromic composition particles having different colors. Further, a specific composition color may be achieved by combining predetermined amounts of monochromic particles of different colors or by combining predetermined amounts of polychromic composition particles of different colors. In this way, all imaginable colors may be incorporated into the composition.

Numerous products may be used to impart coloring to a surface by way of the composition. Such products include, for example, dyes, toners, powder paints, inks, and combinations thereof. Examples of dyes that may be used include water-based dyes such as LIQUIDTAINT™ and VERSATINT® by Milliken Chemical Company. Examples of toners that may be used include reactive toners such as powder toners. Examples of useful powder toners include those that are available from Sawgrass Technologies, Inc., such as NATURA™ powder toners. Further formulations and/or compositions that may be useful include those disclosed in the U.S. Patents and published patent applications provided below in Table No. 1.

TABLE NO. 1

Powder toner formulations.

| Patent/Publication No. | Patent/Publication No. | Patent/Publication No. |
|---|---|---|
| U.S. Pat. No. 6,649,317 | U.S. Pat. No. 5,644,988 | U.S. Pat. No. 5,248,363 |
| U.S. Pat. No. 6,673,503 | U.S. Pat. No. 6,425,331 | U.S. Pat. No. 6,686,314 |
| U.S. Pat. No. 6,618,066 | U.S. Pat. No. 6,439,710 | U.S. Pat. No. 6,631,984 |
| U.S. Pat. No. 6,840,614 | U.S. Pat. No. 6,450,098 | U.S. Pat. No. 6,894,087 |
| U.S. Pat. No. 6,849,370 | U.S. Pat. No. 5,246,518 | U.S. Pat. No. 6,794,426 |
| U.S. Pat. No. 6,887,640 | U.S. Pat. No. 5,302,223 | U.S. Pat. No. 6,759,450 |
| U.S. Pat. No. 5,734,396 | U.S. Pat. No. 5,746,816 | U.S. Pat. No. 6,737,450 |
| U.S. Pat. No. 5,488,907 | U.S. Pat. No. 6,341,856 | U.S. Pat. No. 6,710,102 |
| U.S. Pat. No. 5,487,614 | U.S. Pat. No. 6,152,038 | U.S. Pat. No. 6,664,311 |
| U.S. Pat. No. 5,601,023 | U.S. Pat. No. 6,348,939 | U.S. Pat. No. 6,348,679 |
| U.S. Pat. No. 5,642,141 | U.S. Pat. No. 6,402,313 | U.S. 2005/0123743 |
| U.S. Pat. No. 5,830,263 | U.S. Pat. No. 6,486,903 | U.S. Pat. No. 6,849,837 |
| U.S. Pat. No. 5,640,180 | U.S. Pat. No. 6,540,345 | U.S. Pat. No. 6,649,888 |
| U.S. Pat. No. 5,522,317 | U.S. Pat. No. 6,105,502 | U.S. Pat. No. 6,617,557 |
| U.S. Pat. No. 5,431,501 | U.S. Pat. No. 5,326,872 | U.S. Pat. No. 6,600,142 |
| U.S. Pat. No. 5,555,813 | U.S. Pat. No. 5,177,209 | U.S. Pat. No. 6,812,334 |
| U.S. Pat. No. 5,575,877 | U.S. Pat. No. 6,103,041 | U.S. Pat. No. 6,812,445 |
| U.S. Pat. No. 5,590,600 | U.S. Pat. No. 6,447,629 | U.S. Pat. No. 6,872,444 |

Toner particles useful in the present disclosure may have size characteristics of about 90% or more of the particles having a size less than about 100 microns, or less than about 25 microns, or less than about 10 microns, or from about 0.1 to about 50 microns, or from about 1 to about 20 microns, or from about 3 to about 10 microns, or from greater than about 750 nm to about 100 microns, or larger or smaller particle sizes depending on the desired application. In one embodiment, the toner particle melting point ranges from about 60° C., or less, to about 150° C., or higher, or from about 60° C. to about 275° C. or from about 25° C. to 110° C. or from about 80° C. to about 100° C.

Other toners, compositions, additives, and curing processes useful in the present disclosure are disclosed in, for example, U.S. Pat. No. 6,850,725. Yet other toners, compositions, additives, and curing processes useful in the present disclosure are disclosed in, for example, U.S. Pat. No. 6,713,222. Still other toners, compositions, additives, and curing processes useful in the present disclosure are disclosed in, for example, U.S. Pat. No. 6,680,153.

Examples of powder paints that may be useful include those with epoxy, polyester, polyurethane, and hybrid chemistries either as additives or as particles, described hereinafter. An example of a hybrid chemistry contemplated for use is an epoxy-polyester hybrid, which is routinely used in the reactive powder coating industry. Typical particle sizes for powder paints can range, for example, from greater than about 20 microns to about 50 microns; however, for purposes of the present disclosure, larger and smaller sizes are contemplated. Typical powder paints may have melting point temperatures from around about 107° C. to about 163° C. to about 302° C.; however, lower and higher temperatures are contemplated within the present disclosure.

In another embodiment, the composition is formulated to include one or more thermoplastic resins, thermoset resins, colorants, additives, and/or liquid carriers. Examples of thermoplastic resins include polymeric materials such as polyesters, unsaturated polyesters, styrene-butadiene copolymers, polyurethanes, styrene-acrylates, and/or acrylics. Further, thermoplastic and/or thermoset resins that may be useful in the present disclosure have a melting point of about 260° C. or less.

Further embodiments of the present disclosure may incorporate value adding chemistries including powder coatings, toner and/or ink chemistries, carpet stain removers and/or maskers, odor eliminators and/or absorbers, bleaching agents, and anti-soiling agents. An additional contemplated chemistry includes ultraviolet radiation cross-linking agents that crosslink composition particles in preparation for affixation of the composition to a surface or removal therefrom.

In one embodiment, a composition contemplated in the present disclosure may include one or more additives that may be incorporated during formulation, added post-formulation prior to application of the composition to a surface, and/or after the composition has been applied to the surface. Illustrative additives useful in the present disclosure include, for example, a filler, a metallic particle, an adhesive, a binder, a toner, a resin such as an acrylic, an acrylic latex, a polyester, a urethane, and/or an epoxy resin, a carrier, a lubricant, a wax, a charge additive, a protein, an overcoating lacquer such as an ultraviolet initiator, a ultraviolet light absorber, an ultraviolet stabilizer, an ultraviolet blocker, a stabilizer, a thickening agent, anti-wicking additives, a dry powder, a surfactant, a wetting agent, an emulsifier, a coating (including a thermally releasable coating), a dispersing agent, a perfume, a fragrance, a pigment, a dye, a preservative, a solvent, a lubricant, a fluidity improver, a flow additive, a humectant, a propellant (for example, a pressurized gas or a hydrocarbon based propellant such as butane and propane), a magnetically responsive microparticle, an additive designed to impart health benefits, temporal emission agents, additives providing a safety benefit, additives providing a surface protection benefit, electrical additives, interactive sensory additives, a degassing agent, an antioxidant, a heat stabilizer, a wax, a silicone additive, a catalyst, a texturing agent, an electrical charge control agent, an electrical conductivity agent, a processing aid, a dry powder of a metal salt, a metal salt of a fatty acid, a colloidal silica, an inductive ingredient, a metal oxide, and combinations thereof. Illustratively, a composition contains an additive in an amount of greater than about 0.1%, or less than about 75%, or between about 0% to about 50%, or between about 0.001% to about 30%, or between about 0.01% to about 10%, or between about 0.1% to about 5%, of the total weight of the particle.

An adhesive or binder may include resin particles chosen to exhibit a glass transition temperature that is lower than the glass transition temperature of resins that may be employed in the current disclosure. Adhesives and/or binders with lower glass transition temperatures may positively affect the aesthetic feel of the after affixation. In addition, such adhesives and/or binders may augment the stability of a composition prepared as an emulsion and provide greater mechanical bonding of the composition to carpet fibers, for example, elastomeric materials including styrene/isoprene, styrene/butadiene, and isobutylene. Adhesives and binders may also be selected based on the reversibility on a surface, including, for example, nylon and polyester carpets, before and/or after a curing step, such as, for example, Alcoprint PTU (Ciba Geigy Corp.). A high level of retention after curing may also be desirable in certain applications. Examples of adhesives useful in the present disclosure include polymeric resin and may provide a laminating adhesive between toner particles and/or between a soft surface and the toner particle. In one embodiment, a toner, for example, a clear toner may also act as an adhesive. Examples of adhesives and binders useful in the present disclosure include STYRONAL® ND 656, a styrene butadiene copolymer latex from BASF, and INCOREZ® W2450, a urethane/acrylic emulsion from Industrial Copolymers Unlimited in the UK. Other resins useful in the present disclosure include, for example, crosslinked terpolymers of styrene, acrylate ester, and acrylonitrile available from Zeon Chemical L.P., which include toner resins S-103C and S-111, and styrene-acrylic resins available from Sekisui Chemicals Co. Ltd., including S-LEC resin that is based on a styrene and acrylic copolymer. Other resins useful in the present disclosure include styrene/butadiene, styrene/butyl acrylate, styrene/2-ethylhexyl acrylate, and styrene/butylacrylate resins available from Elikem, including those under the PLIOTONE™ trade name. Polyester resins generally offer lower temperature fusing than styrene/acrylates or styrene/butadiene resins permitting the application of less heat to the composition and/or the soft surface. Illustrative polyester resins include thermoset polyesters, unsaturated polyester resins, such as, orthophthalic, isophthalic, dicyclopentadiene, and bisphenol A fumarate resins, and those available from, for example, Kao Specialties Americas, LLC. Polyurethane resins, including those based on an exothermic reaction of an organic polyisocyanate with a polyol (an alcohol containing more than one hydroxyl group), are also useful in the present disclosure. Illustratively, a composition contains an adhesive in an amount of greater than about 0.1%, or less than about 75%, or between about 0% to about 50%, or between about 0.001% to about 30%, or between about 0.01% to about 10%, or between about 0.1% to about 5%, of the total weight of the particle.

Illustrative stabilizers include a benzophenone, a benzotriazole, a salicylate, a nickel organic, a monobenzoate, a formamidene, an oxalanilide and/or a phenol. Examples of an ultraviolet stabilizer that provides enhanced protection against ultraviolet light includes those disclosed in, for example, U.S. Pat. No. 6,152,038. Examples of thickening agents useful in the present disclosure include those disclosed in, for example, U.S. Pat. No. 6,752,841. Examples of anti-wicking additives useful in the present disclosure can be found in U.S. Pat. No. 5,116,682.

Another embodiment contemplated in the present disclosure may incorporate one or more surface-active (surfactant) agents, for example, emulsifiers. The use of surfactants in the low temperature cure formulations may promote colorant and/or filler wetting, as well as improve flow and leveling of the powder finish. In addition, surfactants promote substrate wet-out during the cure reaction, which improves adhesion and corrosion resistance of the composition. The addition of surfactants may increase the gloss and distinctness of images of the cured composition, as well. The addition of one or more surfactants may act to stabilize the composition formulation, as well as to assist in suspending the particles of a composition formulation. Surfactants useful in the present disclosure include ionic, nonionic, and/or cationic surfactants. Emulsifiers and/or emulsifying agents useful herein include ALCOPRINT™ PTU from Ciba Geigy Corp., the JONCRYL™ series of emulsifying agents available from Johnson Polymer, and others known to those skilled in the art including, for example, adhesive formulations and latex formulations. Other examples of suitable emulsifiers include sodium laurylsulfate, potassium laurylsulfate, or ammonium laurylsulfate, including, for example TRITON™ 100 (octylphenoxy-polyethoxy-ethanol-polyethylene glycol). Illustrative examples of cationic surfactants include dodecyl ammonium chloride, dodecyl ammonium bromide, dodecyl trimethyl ammonium bromide, dodecyl pyridinium chloride, dodecyl pyridinium bromide, and hexadecyl trimethyl ammonium bromide. Illustrative examples of anionic surfactants include aliphatic soap such as sodium stearate, sodium dodecanate, sodium dodecyl sulfate, sodium dodecylbenzenesulfonate, and sodium laurylsulfate. Illustrative examples of nonionic surfactants include poly-oxyethylenedodecyl ether, polyoxyethylenehexadecyl ether, polyoxyethylenenonylphenyl ether, polyoxyethylenelauryl ether, polyoxyethylene sorbitan monoleate ether, and monodecanoyl sucrose. Illustratively, a composition of the present disclosure contains a surfactant in an amount of greater than about 0.001%, or less than about 75%, or between about 0.01% to about 50%, or between about 0.1% to about 30%, or between about 0.01% to about 10%, or between about 0.1% to about 5% of the total weight of the particle.

A fluidity improver useful herein includes, for example, styrene resin, acrylic resin, finely divided hydrophobic silica powder, finely divided titanium oxide powder and finely divided aluminum oxide powder. Further additives may serve as fiber wetting promoters, fiber drying promoters, fiber cleaners, and fiber cleaning promoters. A formulation of the present disclosure may also contain an inorganic particulate additive such as, for example, magnetite, ferrite, cerium oxide, strontium titanate and/or electrically conductive titania.

The composition may also include magnetically responsive microparticles. In this embodiment, the composition may be applied using a static charge and/or magnetically directed force. As an example, iron oxide and/or other magnetic particles known to those in the art form a part of the formulation rendering the composition magnetically responsive. The magnetically responsive property may be used for further placement onto the fiber and/or for enhanced removal from the fiber and/or to aid with aesthetic considerations such as creating designs and/or patterns.

Further, the composition envisioned in the present disclosure may have additives designed to impart additional non-visual benefits such as fragrancing. Further additives may include temporal emission agents, for example, short- or long-term emission agents, such as spot cleaners and odor eliminators, and the like, and/or bioactive agents such as bactericides, miticides, insecticides, pesticides, and/or fungicides, which are released over period of seconds to minutes to hours to days to weeks to months to years.

Illustratively, a formulation of a composition of the present disclosure, for example, an emulsion, contains on a weight to weight basis, at least one of: 1) a surface-active agent in an amount of greater than about 0.1%, or less than about 75%, or between about 0% to about 50%, or between about 0.001% to about 30%, or between about 0.01% to about 10%; or between about 0.1% to about 5%; 2) an adhesive agent in an amount of greater than about 0.1%, or less than about 75%, or between about 0% to about 50%, or between about 0.001% to about 30%, or between about 0.01% to about 10%, or between 0.1% to about 5%; 3) a colorant in an amount of greater than about 0.01% or less than about 95%, or between about 0.01% to about 70%, or between about 0.03% to about 15%, or about 0.05% to about 10%, or between about 0.1% to about 5%; 4) an additive in an amount greater than about 0.1%, or less than about 75%, or between about 0% to about 50%, or between about 0.001% to about 30%, or between 0.01% to about 10%; or between 0.1% to about 5%; and 5) the balance water.

A clear toner may also be included in a composition of the present disclosure in an amount equivalent to, for example, the amount of the colorant. For example, in a toner formulation having 10% by weight a colorant, an additional 10% by weight of the toner formulation contains a clear toner. Illustratively, in a toner formulation with about 0.5% w/w yellow colorant, about 0.4% w/w magenta colorant, and about 0.2% blue colorant, the toner formulation also contains about 1.1% clear toner. In another example, an emulsifier contains about 100 grams of water, about 1 gram of yellow NATURA™ toner, about 0.4 grams of blue NATURA™ toner, about 0.8 grams of magenta NATURA™ toner, about 2.2 grams of clear NATURA™ toner, and about 0.33 grams of ALCOPRINT™ PTU. An emulsion of the present disclosure may be made by mixing the various components of the emulsion for a period of time until the particles of the emulsion are coated with the emulsifying agent or agents. The coating of the particles may enhance the stability of the formulation. The mixing time depends on the particular components utilized in a formulation and can range from, for example, from about 1 minute or less to about 48 hours or longer.

In another embodiment, the composition may be formulated containing a base color such a white and/or neutral color and/or another color onto which desired colors may be overlain. Illustratively, the composition may contain a pH neutralizing and/or adjusting compound such as, for example, a peroxide and/or a bleach, and/or a titanium dioxide-type neutral color application. Another embodiment contemplates a formulation of a highly pigmented coating that has a white and/or neutral color that provides a mask and/or hides a color difference (stain) on a surface. Another composition with a color matching quality with respect to the bulk fiber of the surface (for example, a carpet or textile) may be applied subsequent to the masking of the stain.

In yet another embodiment, a composition may have a glass transition temperature (Tg) from below 25° C. up to the melting temperature (Tm) of the surface substrate to which it is to be applied. In a further embodiment, the Tg ranges from about 45° C. to about 75° C., or from about 45° C. to about 60° C., or about 45° C. to about 70° C., or about 55° C. The Tg and Tm of a composition or a surface substrate may be measured by methods known to those skilled in the art including, for example, dynamic mechanical analysis, thermomechanical analysis, and differential scanning calorimetry. Illustratively, Tg and Tm values of compositions and surface substrates may be determined using a Model No. Q100 Differential Scanning Calorimeter (TA Instruments, Inc.) at a heating rate of 20° C./min.

Application of the composition contemplated in the present disclosure may occur by any appropriate way that is compatible with the composition formulation in question. Illustrative ways to apply the composition to a surface include the use of an ink jet printer, a jet dye process, silk screening, and/or rotary printing. Further, the composition may be applied and/or dispensed with and/or by a spray gun, a sheet, a film, a matrix, a roller, a brush, a marker, a pen, a stamp such as a self-inking stamp, a pump sprayer, a trigger sprayer, a pressurized spraying device, a shaver, a sponge, a squeegee, an airbrush, a fiber separator, a dye applicator, a roller, piezo-electric or heat driven delivery, a manual or electronic sifter, a powder "puff", a felted/flocked brush and/or a powder paint dispenser. The composition may be applied in a wet form, such as, for example, as a suspension or emulsion including, for example, a liquid-based solvent, a foam, a spray, a wet aerosol, or in a dry form, such as, for example, as a powder, a dry aerosol, and/or a powder with a gentle mist.

Additional examples of applicators and/or dispensers of the composition of the present disclosure include, for example, an intermittent pressurized sprayer (such as PULL 'N SPRAY® liquid applicator marketed by the Scotts Company), an actuator spray bottle, a trigger sprayer, a mechanical spray bottle, a pump and/or pump system, a liquid refill containing the composition for a pressurized air chamber, an aerosol barrier pack containing the composition with a driving chamber (with a propellant, for example, carbon dioxide or a hydrocarbon), and a liquid or gel chamber for containing the composition where use would allow pressurized spraying with reduced propellant release to the atmosphere or room being decorated by the user. Other useful sprayers include those disclosed in, for example, U.S. Pat. No. 6,872,444.

Still further other ways to distribute the composition include, for example, a composition impregnated sheet or pad that contains an entrapped composition that when wetted or otherwise activated, releases the composition onto the surface. Another example includes a composition impregnated sheet containing entrapped liquid that releases the composition onto the surface upon pressure application or controlled puncture. A further example includes a composition impregnated sheet with liquid rolled or stamped thereon that promotes even distribution of the composition. Still another example includes an apertured or perforated composition impregnated film that collects and/or directs a releasing substance that once applied to the film releases the composition onto a surface. Yet another example includes a composition impregnated matrix containing therein and/or thereon entrapped composition formulation that releases the composition onto a surface upon pressure, vibration, liquid transfer, heat application, and/or chemical means and/or by an electrostatic deposition device that meters amount of composition to be applied to a surface and precisely lays the composition on the surface.

Still further ways for application of the composition include a multiple chamber system that mixes the composition upon dispensing to give the desired composition color or other characteristic, such as are exemplified in part by trigger release systems (for example, DLS100, DLS 200, or Versitech systems manufactured by Take 5, Anaheim, Calif. (www.take5net.com)), pump systems (for example, VERSA-DIAL® manufactured by Versadial, New York, N.Y., a company under the Sea Change Group) (www.versadialworld.com)), or a multichamber mixer/dispenser that is combined with a composition applicator (for example, a brush, a spray bottle, or other applicator). Further, premixed ready-to-use bottles and/or spray cans may be used to distribute and apply the composition.

Additional technologies contemplated for application and/or dispersion of the composition of the present disclosure include multifunctional devices, such as, for example, a device that combines packaging, design positioning, composition application, and/or removal of a design device from a surface. For example, in one embodiment, a design device, for example, a stencil contains the composition, which can be released onto a surface by applying a releasing agent, such as water, to the stencil. As an example, the use of a dry composition may be reversibly attached to a stencil by means of a water-soluble adhesive or the composition may be attached to a sticky side of a water-soluble transparent film. Further technologies contemplated include sprayers that impart charges to colorant droplets and/or stencils (similar to powder painting), sponging, and felt tip pens and liners.

The composition in one embodiment may be applied using heat transfer technology including, for example, that used by a color copying machine such as a Xerox DOCUCOLOR™ 12 printing onto Xerox 3R5811 or similar transfer paper and/or similar combinations of materials provided by Hewlett Packard, Canon, Geo Knight & Co, Avery Dennison, and 3M.

In one embodiment, a composition may be applied to a substance on a surface, for example, a food stain or other type of stain, to remove the stain from the surface. For example, substances which may be removed from a surface by application of a composition include organic and/or inorganic materials, such as coffee, wine, blood, tomato sauce, mustard, milk, ink, fruit juice, and the like. Illustratively, once a composition is applied to a stain on a surface, the stain is absorbed into the composition, which may then be removed from the surface taking the staining substance with it.

Removal of the composition from the surface may be either through dry removal methods or wet removal methods such as through using various devices and methods including, for example, a vacuum, a vacuum combined with mechanical action such as agitation, wet extraction, steam cleaning, chemical application (for example, applying an organic or inorganic solvent), using an ultrasound process, using detergents, using dilute ammonia solutions, and/or using an abrasive eraser. Some or all of the aforementioned processes may be employed to remove the composition prior to and/or after setting, affixing, and/or curing of the composition on or to the surface.

Examples of solvents useful in the present disclosure include polar and/or nonpolar solvents, including those disclosed in the Handbook of Organic Solvent Properties, Smallwood, I. M. 1996, Elsevier. Such solvents include, for example, water, hydrocarbons, aromatic hydrocarbons, aliphatic hydrocarbon solvents such as aliphatic alcohols, other alcohols, glycol ethers, nitrated and chlorinated solvents such as chlorinated hydrocarbons, ketones, ethers, and/or esters. Other useful solvents include acetone, amines, benzyl acetate, phenols, polyvinyl alcohol, and/or the organic sulfone or sulfoxide families including dimethyl sulfoxide. Detergents and soaps may also be used to remove a composition from the surface. Combinations of the above may also be used.

By way of example, stain neutralization on a surface, such as a carpet may be determined in the following manner. Initially, a test surface, such as, for example, a two-foot by two-foot square piece of nylon carpet or polyester carpet is thoroughly cleaned using an upright vacuum cleaner (for example, a Bissell CLEANVIEW® II vacuum cleaner, manufactured by Bissell Homecare, Inc.) to remove loose fibers and/or dirt. The baseline color of each of three spots to which a stain will be applied is determined using a colorimeter such as a Minolta data processor Model No. DP-301 combined with a Minolta Model No. CR-310 chroma meter (both manufactured by Konica Minolta Sensing Americas, Inc.) set to the "L-a-b" setting to record $\Delta E$ (color change) and calibrated according to the manufacturer's instructions. A stain is applied, for example, a coffee stain or a wine stain, to the test carpet and allowed to dry until only damp to the touch. Once the stain is mostly dry, the color of each of the stain on the three spots is determined using the colorimeter as mentioned above.

A composition of the present disclosure is applied onto the stain on the three spots of the carpet using, for example, a finger pump (output 60 micron particle size) until the test area is completely saturated. The composition is allowed to dry to the touch, which is typically overnight to assure complete drying, though shorter or longer periods may be used depending on, for example, the relative humidity and/or temperature of the ambient environment. After the composition is dry, the three spots are vacuumed in one direction several times and repeated in the other direction to ensure adequate removal using a wet/dry vacuum with a hose attachment and brushless triangular tool, such as, for example, a Shop-Vac® 1×1 portable wet/dry vacuum (12 V, 60 Hz, 5.5 A, Model No. 2101A, manufactured by Shop-Vac, Inc.). After vacuuming, a colorimeter measurement is taken to determine the change in color. Change in color ($\Delta E$) was determined using the following formula:

$$\Delta E = \sqrt{((L_1-L_2)^2+(a_1-a_2)^2+(b_1-b_2)^2)}$$

where "L" refers to "lightness" with values of 0=black to 100=white; increasing "a" values indicate more red color and decreasing "a" values indicate more green color; and increasing "b" values indicate more yellow color and decreasing "b" values indicate more blue color. Illustratively, a neutralized stain has a $\Delta E$ value as compared to the initial reading of an unstained and untreated carpet of less than about 20, or less than about 10, or less than about 7.5, or in the range of about 0 to 15. In a further illustration, stain neutralization (for example, stain removal and/or stain masking) by application of a composition of the present disclosure results in a reduction in the $\Delta E$ value of a stain compared to an unstained and untreated surface of less than about 50%, or less than about 80%, or less than about 90%, or about 100%.

Factors that may affect reversibility of the composition from a surface may include, for example, composition specific factors, application specific factors, and/or surface specific factors. Examples of composition specific factors may include the type and/or concentration of emulsifier included in the composition formulation, which may affect adherent interactions between the composition and the surface to which the composition is applied thereto. Further, when the composition includes a particulate component, for example, a particle, the reversibility of the composition may be affected by the size of the particle. Although not wishing to be bound by theory, it is believed that smaller particle size may affect reversibility due to possible greater penetration of the particles into recesses and interstices of a non-smooth surface such as carpet, thus reducing access to the smaller particles for the subsequent removal process.

Application specific factors that may affect reversibility include the extent of surface saturation when applying the composition to the surface and the method and/or device used to apply the composition to the surface. Surface saturation includes, for example, the density of applied composition on the surface. Greater surface saturation may lead to an increased likelihood of residual composition remaining after removing the major portion of composition applied to the surface, and/or greater penetration of the composition into the recesses and interstices of the surface thereby reducing accessibility of the removal process to the compositions. Further, the method and/or application device used to apply the composition may affect reversibility. Illustratively, the composition may be applied to a surface in a fashion to coat the surface with little to no surface penetration. For example, an applicator that applies the composition in a mist, such as by a finger pump with a 60 micron or less spray nozzle, may be used to coat the surface with little or no penetration of the interstices of the surface. In this example, composition reversibility may be improved owing to the minimal surface penetration of the composition. However, if it is desired to apply the composition with an aerosol spray container, or other such applicator that expels the composition from the container with a greater velocity than, for example, a hand pump, deeper penetration of the surface may result, which may affect removal of the composition from the surface by, for example, limiting or inhibiting access of the removal process to the composition.

Surface specific factors that may influence composition reversibility include, for example, surface structure and/or texture, the electrostatic charge held by the surface, and/or surface pretreatments affecting, for example, surface tension. Surface structure factors such as fiber density, in the case of carpets and the like, may influence composition reversibility. For example, dense carpet structures may be more likely to minimize particle penetration as opposed to open structures such as, for example, nylon shag carpets and older carpets with damaged braids. Thus, less dense surfaces may influence composition reversibility by, for example, reducing the access of the composition to the removal process as compared to more dense surfaces.

Further, surface electrostatic charge and/or surface tension may influence reversibility. Illustratively, a surface treatment may be used to lower the electrostatic charge and/or surface tension to improve the reversibility characteristics of the compositions. Examples of surface treatments that may be used include 3M SCOTCHGUARD™ Carpet and Upholstery Protector (manufactured by 3M) and/or Advanced TEFLON® Carpet protector (manufactured by E.I. du Pont de Nemours and Company). Further, such pretreatments may promote composition coverage and/or dispersion on the surface with smaller volumes of the composition thus indirectly promoting composition reversibility through minimizing the risk of oversaturation.

In some instances, the composition may be formulated to have a larger particle size to improve or enhance reversibility by reducing the amount of particles based on size that can penetrate the smaller interstices of the surface. Further, and not wishing to be bound by theory, it is believed that smaller sized particles may be held relatively more tightly to the surface by an electrostatic charge and/or surface tension as compared to larger particles, making the smaller sized particles relatively more difficult to remove from the surface as compared to larger sized particles. Thus, in some embodiments, surface pretreatment, additional effort and/or additional methods may be needed to achieve the same reversibility characteristics for compositions formulated with smaller particles as compared to compositions formulated with larger particles.

Once a composition has been applied to a stain or other substance on a surface and has subsequently been removed, residual stain may remain on the surface. To further treat the stain in order to restore the surface back to an acceptable appearance, subsequent applications of the composition may be made to mask the stain. In this embodiment, the composition which may be formulated to substantially mask the stain may be affixed to the surface to provide a temporary, permanent, and/or semi-permanent stain mask. An example of a semi-permanent composition includes a composition with a temporary adhesive that adheres a particle to the surface. Such a formulation may provide short term affixation of the composition to a surface.

Further, once a composition of the present disclosure has been applied to a surface and the user has decided to keep the composition on the surface, the composition may be cured and/or affixed permanently by chemical curing and/or mechanical bonding to the surface. Any curing or affixing technique compatible with the composition and the surface is contemplated in the methods disclosed herein including, for example, the application of energy and/or a chemical to the composition. Examples of curing or affixing techniques include, for example, heat curing, steam curing, pressure curing, exposure to an electromagnetic field, including for example, ultraviolet radiation, radio frequency curing, a magnetic field, and the like, ultrasound curing, induction heat curing, solar heat curing, exothermic reaction heat curing, convective heat curing, and/or radiant heat curing. Further, curing or affixation of the composition may be accomplished by exposure of the composition to the ambient environment.

The composition in one embodiment may be affixed to a surface using heat in a range from about $-7°$ C. to about $650°$ C., or about $4°$ C. to about $400°$ C., or at a temperature less than about $260°$ C., or about $20°$ C. to about $180°$ C., or about $65°$ C. to about $120°$ C., or higher and lower temperatures depending on the surface in which the composition is applied. Further, the duration of the curing or affixing step is generally composition- and/or surface-specific, and illustratively, ranges from less than about 1 second to about 15 minutes, or from about 15 minutes to about 1 hour, or from about 1 hour to about 4 hours, or from about 5 hours to about 8 hours, or from about 8 to about 12 hours, or longer for curing of the composition may be required.

Tools that may be used to cure and/or affix the composition to a surface include, for example, a hot iron, an enclosure or frame containing a CALROD™ heating element suspended over the surface being heated, an enclosure or frame with one or more incandescent light bulbs, a heat gun, an enclosure or frame with a heater and a blower to infuse hot air onto the substrate, an enclosure or frame with an infrared heating element, an enclosure or frame with an ultraviolet light source, a steam-making device, a heated tool (for example, a household iron, an electric griddle, or a hair dryer or objects similar in function but specifically designed for the application), or a microwave emitting device or a radio frequency emitting device. The devices contemplated herein to be used for affixation may incorporate heat sensors and timers to facilitate the affixation process and further protect the surface to which the composition is being applied from damage from overheating.

Additional ways to affix the composition to a surface include inductive heating of a composition containing metal nano- or microparticles, moisture curing systems, adding magnetic enhancements to a deposited composition, and treatment of additives within the composition to induce affixation. Further ways to affix the composition to a surface include those disclosed in the U.S. Patent and published patent application provided in Table No. 1 above.

Protective coverings may also be applied to a deposited composition for the purpose of affixing the composition and/or to add to the resiliency of the composition against wear. Useful protective coverings include, for example, nanoparticle coating compositions disclosed in, for example, U.S. Pat. No. 6,872,444. Further, fixatives useful in the present disclosure include those used in artistry to fix and/or seal, for example, pastels, pencil, charcoal, crayon, ink, gouache, or watercolor. Such fixatives include those available under the trade names Blue Label Reworkable FIXATIF® (Martin F. Webber Co.), GOLDEN® Archival Spray Varnish (Golden Artist Colors Inc.), KRYLON® Workable Fixative (Krylon Products Group, The Sherwin-Williams Company), and LASCAUX® Fine Art Fixative (Lascaux Colours & Restauro, Switzerland).

It is further contemplated that the surface to which a composition is to be applied and/or affixed thereto may be conditioned prior to the application of the composition. Examples of such conditioning include, but are not limited to cleaning, vacuuming, steam cleaning, bleaching, pH balancing, reducing the pH, increasing the pH, sweeping, painting, scrubbing, wetting, texturing, leveling, tilting, drying, heating, cooling, sanding, buffing, coating, removing coatings therefrom, reducing the electrostatic charge of the surface, and/or applying a surface treatment, such as an upholstery and carpet protector including, for example, 3M SCOTCHGUARD™ Carpet and Upholstery Protector (manufactured by 3M) and/or Advanced TEFLON® Carpet protector (manufactured by E.I. du Pont de Nemours and Company).

A further embodiment of the present disclosure includes the use of a design device that a user may use to control the application of the composition to a surface for the purpose of creating, for example, a pattern on the surface to enhance the aesthetic effect of the composition. Further, the design device may be so fashioned as to cause a composition gradient to be applied to the surface by having different areas with varied composition permeability. Possible composition patterns on surfaces contemplated in the present disclosure include any and all images, patterns, shapes, and/or designs. Preselected or random patterns may also be imparted to a surface using an inherent dispersal pattern from a composition applicator with or without movement of the applicator over a selected surface during application of the composition. For example, by using a spray applicator with a cone-shaped dispersal pattern, a user may choose to apply discrete spots and/or circles having diameters that are varied by varying the distance from which the applicator is held from the surface during application of the composition. Further, a user may move the applicator during application of the composition over the surface in a predetermined or random pattern to achieve a predetermined or random pattern on the surface. As such, preselected patterns and/or random patterns may be imparted to a surface with or without a design device.

Design devices contemplated in the present disclosure may limit, direct, focus, concentrate, guide, dilute, and/or disperse an amount of composition applied to certain predetermined areas of a selected surface. The design device may include, for example, a stencil, a template, an array, a guide, a frame, a pattern imparting device, a device imparting graphics in a random manner, a manual device, an automatic device, a computer guided device, a programmed device, and/or any combination thereof. The design device contemplated for use herein including, for example, a stencil, may be constructed totally or in part with a material such as, for example, paper, wood, stone, plastic, cardboard, metal, and/or any combination thereof.

Stencils or other design devices contemplated for use in the present disclosure may be designed, constructed, shaped, and/or reshaped, in a predetermined, ordered, disorganized, and/or random manner by means of laser, knife, die cutting, and/or any other appropriate means as determined by the nature of the stencil material (for example, hardness or softness of the stencil materials) to render a predetermined, ordered, disorganized, and/or random shape that allows a predetermined, ordered, disorganized, and/or random deposition of at least a visual design by introducing a composition on a surface. The stencils may further be laminated and have additional layers applied thereto post-construction and/or post-designing.

An exemplary stencil useful in the present disclosure includes a material containment layer (absorbent of liquids and/or entrapping of dry materials and/or solids) that includes a paper tissue, a synthetic non-woven material that may or may not be coated with an absorbent hydrophilic material, and/or a solid and/or liquid entrapping substance. The material containment layer may have a thickness of about 0.01 mil to about 1000 mils, or about 0.1 mil to about 500 mils, or about 0.5 mil to about 150 mils, or about 1.25 mils to about 50 mils, or about 2 mils to about 15 mils, or a lesser or greater thicknesses depending on the application. The stencil may also incorporate a barrier layer to protect a selected surface from unintended colorant exposure that may comprise a liquid barrier made of any hydrophobic material, including a polyolefin such as polyethylene. The liquid barrier may also be comprised of a coating applied to one surface of the absorbent material to hinder liquid transport through the absorbent material. Such a coating may be polymeric in composition such as an acrylic polymer. The liquid barrier may have a thickness in the range of about 0.01 to about 1000 mils, or about 0.1 mil to about 500 mils, or about 0.5 mil to about 150 mils, or about 1.25 mils to about 50 mils, or about 2 mils to about 15 mils, or lesser or greater thicknesses depending on the application. An example of a material containment layer and barrier layer combined together useful in the present disclosure, includes the commercially available GOTCHA COVERED® drop cloth by Kimberly-Clark Corp.

In another embodiment, the material containment layer and the barrier layer may be made of the same material. For example, a dual purpose material (for example, a paper material) that has densities that differ by layers. In this example, the top layer of the dual purpose material corresponds to the material containment layer and has a density that absorbs liquids and/or entraps dry material and/or solids and the bottom layer corresponds to the barrier layer and has a density that prevents passage of liquids therethrough. Further, varying thicknesses may contribute to the functionality of the dual purpose material previously described in addition to or in lieu of varying material densities. Such a dual purpose material may be advantageous over using multiple materials to create a stencil envisioned in the current disclosure by facilitating manufacture of the stencil.

Another stencil that may be used in the present disclosure may also include a solid support layer that has securement and/or attachment properties, such as tulle, scrim, and the like. Illustratively, when the support layer is laid upon a surface, the support layer comes in contact with the surface to which the stencil is to be secured in such a way as to adequately secure the stencil to the surface to allow deposition of the composition upon the surface and render the intended result. The support layer may also comprise other adherent mechanisms, properties, and/or devices such as VELCRO®, VERSA HOOK from Avery Dennison, adhesive strips, pressure-sensitive adhesive, and/or any standard bonding mechanism known to those skilled in the art. An additional solid support layer including, for example, a loose grid, web, or mesh-like material including, for example, thread, is envisioned that may be placed adjacent the barrier layer of the stencil. In this embodiment, the cutout portion may extend through the material containment layer, the barrier layer, and the support layer. An exemplary stencil useful in the present disclosure in which the support layer is a pressure-sensitive adhesive includes that disclosed in, for example, U.S. Pat. No. 6,779,443. The support layer may be of sufficient area to minimize unintended exposure of a surface, as well as function to maintain the structural integrity of the stencil.

The present disclosure also provides kits that contain one or more components herein described, including, for example, a design device and/or a composition that may be substantially removed from a surface prior to being affixed thereon. A set of instructions may also be included in the kit instructing the user how to apply the design to a soft surface such as a carpet. The kit may further comprise one or more application devices for transferring the composition to the carpet and/or one or more fixative devices for affixing the composition to the surface. In addition, the kit may include a protective covering for protecting the composition after it has been applied to the carpet, especially while it is drying. The kit may further include an iron screen that is used to provide a user with an indication of what areas of the composition have already been ironed or affixed.

As an example, the kit may be provided having a stencils, a composition, an application device such as a sprayer, an affixing device such as a heating device (for example, an iron or a radio frequency emitting device), and/or a set of instructions. One of the stencils that could be included in the kit is shown generally at 10 in FIG. 1. The stencil 10 may be used to control the application of a composition to a stain on a surface by placing the stencil on the surface and centering a cutout portion 14 over the stain. In this embodiment, the stencil 10 includes an absorbent layer 12, a barrier layer (not shown), and a solid support layer (not shown), and one or more cutout portions 14 that permits restricted passage of the composition through the stencil to the surface to create, for example, a gradient pattern on the surface when the composition is applied to the stencil. The kit may also include a system to identify, choose, make, modify, and/or prepare the surface on which the composition is to be applied. Further, a cross-sectional view of the stencil 10 is shown in FIG. 2. Here, the absorbent layer 12 is disposed adjacent the barrier layer 16, which is disposed atop the solid support layer 18.

The numerous options for customization inherent to all aspects of the present disclosure may be more completely utilized by a user with the assistance of one or more consumer aids. Consumer aids contemplated in the present disclosure, which may be provided in a kit, individually and/or in any suitable fashion include any and all design mechanisms and/or aids and devices that enable the consumer to use the present disclosure including instructions, color predicting aids, design templates showing the look prior to and/or after applying the composition to a stain, instructional videos, CD-ROMS, internet web pages to select and predict designs, colors, and overall looks, interactive computers terminals, in store displays, customer service, advertising, training courses, recorded messages, text messages, mailings, books, literature, lectures, training courses, correspondence courses, and any combination thereof, as well as, other communicating means. Through the aforementioned communicating means, a user may be taught, for example, how to use a kit including the present disclosure. Further, the user may be instructed how to employ the disclosure for commercial applications such as, for example, interior design applications.

Figure 3:
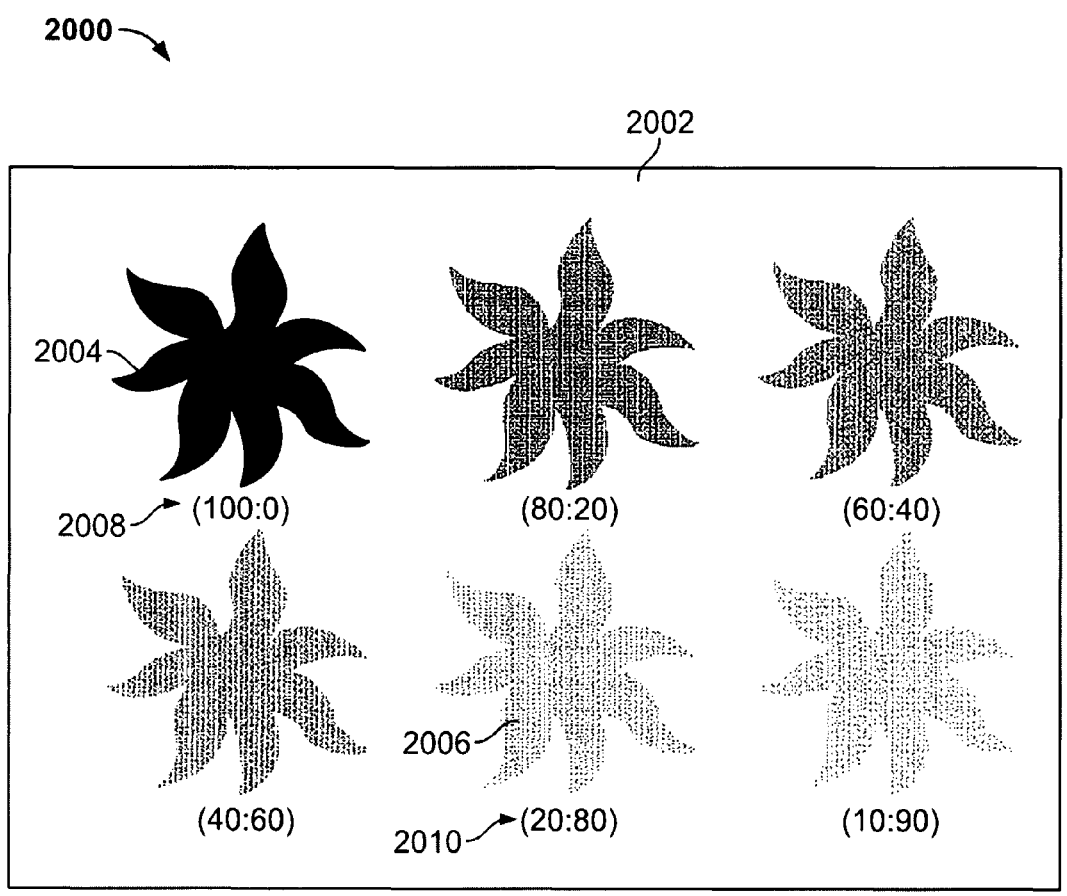
FIG. 3 is an illustration of a consumer aid according to one embodiment.

Illustratively, in FIG. 3 an exemplary consumer aid 2000 is shown that enables a user to preview how a surface will appear after stain neutralization due to application of a composition that may vary by color (or shade or tint or texture, and any other variation) when the consumer aid is placed on the surface. The consumer aid 2000 may enable the user to make or mix the composition and/or assist the user in selecting the color of the composition that would be an appropriate neutralizing color and/or contrast when compared to the base color of the surface. The consumer aid 2000, in this case, is included in a kit having two compositions of differing colors, such as beige and white. Further, the consumer aid 2000 includes instructions on how to achieve each variation in pattern displayed on the consumer aid, in this case varying shades of beige. The consumer aid 2000 of the current embodiment includes a transparent sheet 2002 upon which is disposed a pattern 2004 that is repeated a number of times, such as six times. Each repeat has a different shade of beige becoming lighter progressing from upper left to lower right, as is seen by comparing, for example, pattern 2004 and pattern 2006. Beneath each pattern repeat is a ratio printed on the transparent sheet 2002 that indicates a mixture percentage, such as is seen at 2008 where a mixture of 100 percent beige and 0 percent white is indicated or as is seen at 2010 where a mixture of 20 percent beige and 80 percent white is indicated. In this way, a user may achieve each of the shades of beige associated with each pattern repeat by mixing the beige and white compositions included in the kit at the percentages indicated. Further, any color may be created in this manner by mixing appropriate amounts of differing colored compositions. Further, any sort of instructions is contemplated to instruct a user to achieve a given color and/or pattern appearance. Further, the kit may also include a combined mixing and application device that contains the composition(s) and corresponds with the consumer aid, such that the percentages given the example above for mixing beige and white compositions may indicate how to adjust the settings on the mixing and application device to achieve the indicated color or shade or texture shown on the consumer aid 2000.

Additional consumer aids include devices to be employed by persons such as a user, an agent of the user, a trainer, a displayer, a salesman, a teacher, or a technician to enable the user to use the present disclosure such as color carpet chips, for example, pieces of carpet with differing composition formulations of differing coverage affixed thereon to demonstrate how different composition formulations appear on different types and/or colors of carpet. Further consumer aids include color templates, for example, sheets of opaque or clear material of different colors with different colors of composition affixed thereon with instructional ratios of the base colorants used to make each composition color to allow the user to make each composition color from the separate base colorants and other additives. Additional consumer aids include, carpet templates, stencil templates, tester samples (similar to Benjamin Moore tester samples), trial periods, color matching sheets, for example, similar to color matching sheets used in make-up matching to skin tones, used to match colors, or to predict color look and contrast, color blending sheets, for example, similar to color matching sheets that further allow a user to preview combined colors on a surface, color charts, color graphs, color analysis devices, calorimeters, color scanners, software algorithms for color assessment and formulating colors, and other means for determining proportions and types of composition to be used for a specified or unspecified surface in a room, hallway, house, building, or other area.

In addition, by mixing differently colored compositions, any number of additional colors may be formed. As an example, a user may purchase one or more pre-formulated colored toners or may mix various colored toners to achieve any desired color. Design mechanisms such as color charts, color analysis devices, or other ways for determining the proportion and type of colored toner to achieve a particular color can also be provided to a user. Additionally, a user may directly apply the toners to the surface or the toners may be incorporated into the composition such as by mixing the toner with water or another solvent, or a predetermined formulation of more than one part to make a liquid suspension or emulsion, for example, and then applied to the surface.

Additional consumer aids include devices to be employed by the user to help the user identify, (for example, tools and/or kits used to identify the type or composition of carpet fibers to help direct the user toward a particular composition formulation), choose, make, modify (for example, kits or compounds that can be included in kits to alter the physical appearance of a surface, such as an embossing compound), combine, and prepare surfaces on which a composition may be applied and/or affixed. These consumer aids enable the user to choose the correct composition formulation for a given surface to have a given intended effect, for example, a textured look on a soft surface or a smooth look on a hard surface, or any combination thereof.

Further, the consumer aids may help users in choosing, making, modifying, combining and/or preparing design devices, such as a stencil, to render images, patterns, shapes, and/or designs to be imparted to the surface when applying the stencil and/or a composition to the intended surface. Still further, the consumer aids contemplated help or assist the user in choosing, using, making, modifying, and/or preparing composition formulations that may be ready-to-use or require preparation prior to application to a surface.

Additional consumer aids may take the form of store displays and/or presentations of the disclosure, including, for example, the composition packaged in liquid form or powder form to be suspended in liquid immediately before use, and/or one or multiple composition colors and composition additives to be mixed before use, and/or a kit comprising elements of the present disclosure such as multiple or single colors, one or more designs, instructions, an application device, a fixative device, a protective covering, and/or an iron screen or other indicator, such as, for example, a color changing additive, to differentiate between fixed and unfixed areas of the applied composition.

Illustrative chemistries useful in a composition of the present disclosure include a low temperature cure epoxy particle, a low temperature cure epoxy-polyester hybrid particle, and/or a low temperature cure polyester-triglycidyl isocyanurate (TGIC) particle. Typical ranges of constituents of the aforementioned particles contemplated in the present disclosure include an amount of binder, which includes at least a polymer or resin and one or more curatives, based on weight percentages of about 50% or greater of the total weight of the particle. Further, other components of the particle, including, for example, additives, fillers, pigments, degassing agents, flow additives, and the like, may be included in amounts ranging from about 50% or less of the total weight of the particle. Such ranges may be adjusted to attain the desired characteristics of the particle as appropriate as is known to those skilled in the art. Further, to assure full stoichiometry of reactions between polymers and/or resins and curatives, amounts of polymers and/or resins and curatives used may range from about 50% to about 150% based on relative equivalent weights of the compounds and/or as recommended by the manufacturer.

A low temperature cure epoxy particle may include a binder system that has an epoxy resin and a curative. An example of an epoxy resin is a bisphenol A resin having the following general chemical structure of Formula I:

Diglycidylether of Bisphenol A (DGEBA)

Formula I:

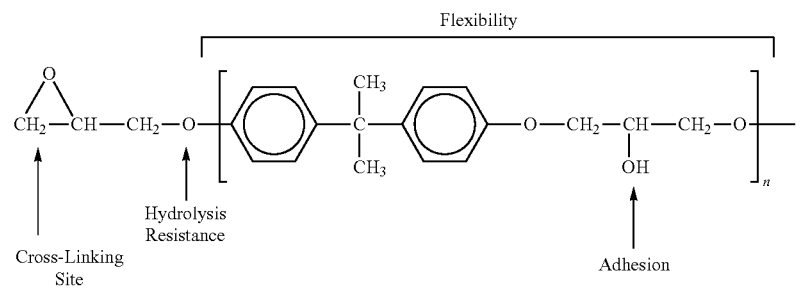

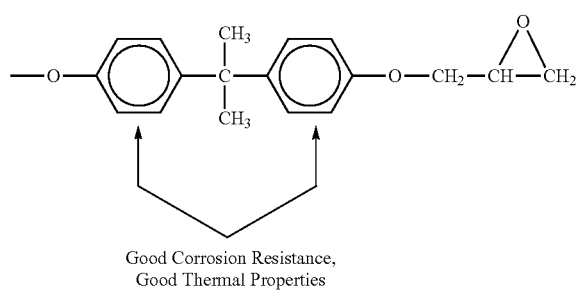

wherein n is an integer from 2 to 20.

Bisphenol A epoxy resins useful in a particle include those resins having an epoxy equivalent weight of about 650 to about 900, or about 700 to about 750; a Tg of about 45° C. to about 75° C., or about 55° C.; and/or an ICI cone and plate viscosity of about 5 poise to about 100 poise, or about 35 poise at 150° C.

Another example of an epoxy resin useful in a formulation of the present disclosure is a novolac epoxy resin. Examples of novolac epoxy resins include the following general chemical structures of Formulas II and III:

Epoxy Phenol Novolac

Formula II:

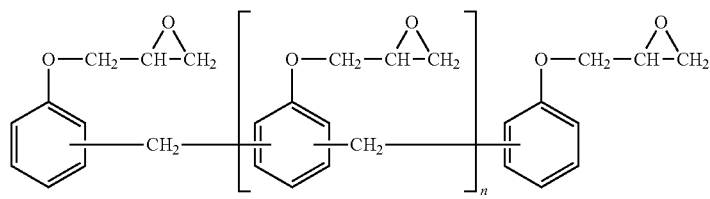

Epoxy Cresol Novolac

Formula III:

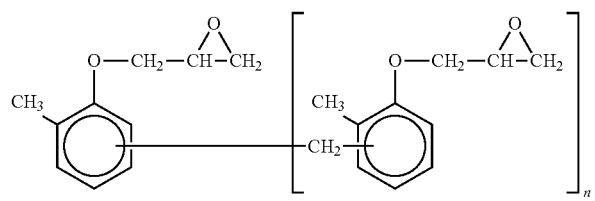

n = 1-4 wherein n is an integer from 1 to 4.

The glass transition temperatures and viscosities of the novolac epoxy resins are similar to those provided above for the bisphenol A epoxy resins. A curative agent useful in a binder system that has an epoxy resin includes, for example, a phenolic curative. An example of a phenolic curative agent is Huntsman Hardener XB 3086 supplied by Huntsman Advanced Materials (Switzerland) GmbH, which is compatible with bisphenol-A-based epoxy resins and novolac-epoxy-based resins. The Huntsman Hardener XB 3086 contains phenol, 4,4'-(1-methylethylidene)bis-, polymer with 2,2'-[(1-methylethylidene)bis(4,1-phenyleneoxymethylene)]bis[oxirane] (commonly described as a polymer of epoxy resin and bisphenol A), a Huntsman Advanced Materials confidential accelerator, and Phenol, 4,4'-(1-methylethylidene)bis- (commonly known as Bisphenol A). The Huntsman Hardener XB 3086 has the following properties: amine value of 0.83-0.93 eq/kg, recommended combining weight of about 135, and a softening point of 84° C. to 94° C.

Stoichiometric ratios of the epoxy resin and the curative are calculated based on the combining weights, or equivalent values, of resins and curatives. Values of the combining weights may be determined by chemical structure (for example, average molecular weight divided by the number of reactive groups, amine values, acid or hydroxyl numbers, etc.) or empirically based on laboratory experiments. For example, using a lower molecular type 3 bisphenol A epoxy resin with an epoxy equivalent weight (EEW) of 700 and Huntsman Hardener XB 3086 with a manufacturer recommended equivalent weight of 135, the calculation for a full (100%) stoichiometry is shown below in Table No. 2.

TABLE NO. 2

Full Stoichiometry of an Epoxy Resin and Curative Agent Particle.

| Constituent | Epoxy Equivalent Weight | Approx. Percent |
| --- | --- | --- |
| Type 3 Bisphenol A Epoxy Resin | 700 | 84.2% |
| Huntsman Hardener XB 3086 | 135 | 15.2% |
| Total | 835 | 100.0% |

In other embodiments, the epoxy resin and curative agent ratio may range from, for example, about 84% to about 85% epoxy resin to about 16% to about 15% curative agent. To lower the cure temperature of an epoxy particle, accelerants and/or catalysts such as, for example, a phenolic curative may be incorporated into the composition. An illustrative phenolic curative has a combining weight of about 100 to about 500. Other accelerants and/or catalysts compatible with epoxy resins known to those skilled in the art may also be used. An illustrative cure condition for an epoxy-polyester hybrid particle includes a bake time of about 15 minutes at about 150° C., or less.

The low temperature cure epoxy particle composition may include any desired colorant and/or additive. Illustratively, a low temperature cure epoxy particle composition may include the following constituents as shown below in Table No. 3.

TABLE NO. 3

Low Temperature Cure Epoxy Particle Compositions.

| Constituent | Approx. Weight % |
|---|---|
| Bisphenol A Epoxy | 48-58 |
| Bisphenol A Curative | 9-11 |
| Flow Additive | 0.2-3 |
| Degassing Agent | 0.2-5 |
| Colorant | 0.3-40 |
| Filler | 10-30 |

Another illustrative chemistry useful in a composition is a low temperature cure epoxy-polyester hybrid particle that has a binder system having a low temperature cure epoxy and a polyester resin. Illustrative epoxy resins include the bisphenol A epoxy resins or Novolac epoxy resins described above. An illustrative polyester resin includes an acid terminated saturated polyester resin. The polyester resin may have an acid number of between about 75 and about 85. Example includes acid terminated saturated polyesters used as a co-reactant in epoxy-polyester hybrid coating powder formulations. The polyester may be synthesized from neopentyl glycol, terephthalic acid, trimellitic anhydride, and other types of glycols and dibasic organic acids. The branched polyesters may have resin functionalities of about 2 to about 4, or of about 2.5 to about 3.5 (indicating, that about 2.5 to about 3.5 carboxyl groups per polyester molecule). Resin acid numbers may range from about 35 to about 90 with hydroxyl numbers of about 5 to about 10 (residual hydroxyl). Acid terminated, saturated polyester resins suitable for combination with epoxy resins may have an acid number of about 70 to about 90, or about 80; a calculated combining weight (combining weight equals 56,100/acid number) of about 625 to about 800, or about 700; a glass transition temperature about 45° C. to about 60° C., or about 55° C.; and/or an ICI cone and plate viscosity of about 15 poise to about 50 poise, or about 25 poise, at about 200° C.

To lower the cure temperature of an epoxy-polyester hybrid particle, an accelerant and/or catalyst such as, for example, a stannous-organic and/or imidazole-type compound may be incorporated into the composition. Other accelerants and/or catalysts known to those skilled in the art may also be used. An illustrative cure condition for an epoxy-polyester hybrid particle includes a bake time of about 15 minutes at about 150° C., or less.

Stoichiometric ratios for an epoxy-polyester hybrid particle may be calculated based on the combining weights of resins and curatives. However, as known in the art, molecular structure and chemical functionalities may differ and fluctuate for organic polymer products, making the depiction and calculation of chemical reactions more difficult and ambiguous than for inorganic chemical reactions. Illustratively, stoichiometric ratios may be calculated based on combining weights (also referred to as equivalent values) of epoxy and acid-terminated polyester resins. The values of the combining weights may be determined by chemical structure (for example, average molecular weight divided by the number of reactive groups, amine values, acid numbers, etc.). For example, a lower molecular weight type 3 bisphenol A epoxy resin with an epoxy equivalent weight of 700 and an acid terminated saturated polyester resin with an average number of 80 (combining weight of polyester equals 56,100 divided by 80, which equals approximately 700), provides a full (100%) stoichiometric calculation as shown below in Table No. 4.

TABLE NO. 4

Full Stoichiometry of an Epoxy-Polyester Hybrid Particle.

| Constituent | Epoxy Equivalent Weight | Approx. Percent |
|---|---|---|
| Type 3 Bisphenol A Epoxy Resin | 700 | 50% |
| Acid Terminated Polyester | 700 | 50% |
| Total | 1400 | 100.0% |

The low temperature epoxy-polyester hybrid particle composition may include any desired colorant and/or additive. Illustratively, a low temperature cure epoxy-polyester hybrid particle composition may include the following constituents as shown below in Table No. 5.

TABLE NO. 5

Low Temperature Cure Epoxy-Polyester Hybrid Particle Compositions.

| Constituent | Approx. Weight % |
|---|---|
| Bisphenol A Epoxy | 29-34 |
| SP3320 Hybrid Polyester | 29-34 |
| Flow Additive | 0.2-3 |
| 2-PI (Catalyst) | 0.2-0.8 |
| Degassing Agent | 0.2-5 |
| Colorant | 0.3-40 |
| Filler | 10-30 |

Another illustrative chemistry useful in a composition is a low temperature cure polyester-triglycidyl isocyanurate (TGIC) particle. Illustratively, a polyester includes an acid terminated saturated polyesters synthesized using, for example, a monomer such as trimethylolpropane, terephthalic acid, neopentyl glycol, adipic acid, hexanediol, 1,4-cyclohexyldimethanol, and isophthalic acid, and pentanediol. The polyesters in one embodiment have resin functionalities of about 2.05 to about 2.2 (that is, about 2.05 to about 2.2 carboxyl groups per polyester molecule). The resin acid numbers may range from about 20 to about 60, or range on average from about 28 to about 38. The hydroxyl numbers may range from about 5 to about 10 (residual hydroxyl). TGIC is a trifunctional epoxide resin that is used as a hardener in polyester-based powder formulations. The combining weight of TGIC is 106. Illustratively, an acid terminated, saturated polyester resins suitable for combination with TGIC in a low temperature cure polyester-TGIC particle possess, for example, an acid number about 30 to about 40, or about 35; a calculated combining weight (combining weight equals 56,100 divided by acid number) of about 1,400 to about 1,870, or about 1,600; a glass transition temperature about 45° C. to about 70° C., or about 55° C.; and/or an ICI cone and plate viscosity of about 15 poise to about 50 poise, or about 25 poise, at 200° C.

To lower the cure temperature of a polyester-TGIC particle, an accelerant and/or catalyst such as, for example, triphenylethyl phosphonium bromide and/or imidazole-type compounds may be incorporated into the composition. Other accelerants and/or catalysts known to those skilled in the art may also be used. For example, a glycidyl curative chemistries such as aliphatic, cycloaliphatic, aromatic, and methacrylate based glycidyl compounds with equivalent weights of about 50 to about 1,000 and melt temperatures below about 125° C. may by utilized in the low temperature cure polyester-TGIC particle. An illustrative cure condition for a polyester-TGIC particle includes a bake time of about 15 minutes at about 135° C.

As mentioned above, molecular structures and chemical functionalities may differ and fluctuate for organic polymer products. Illustratively, stoichiometric ratios are calculated based on the combining weights of epoxy and acid terminated polyester resins. Values of the combining weights may be determined from the chemical structure of the respective compounds. For example, an acid terminated saturated polyester with an average acid number of 35 (combining weight of polyester equals 56,100 divided by 35, which equals approximately 1,600) combined with TGIC, provides a full (100%) stoichiometric calculation as shown below in Table No. 6.

TABLE NO. 6

Full Stoichiometry of a Polyester-TGIC Particle.

| Constituent | Epoxy Equivalent Weight | Approx. Percent |
|---|---|---|
| Acid Terminated Polyester | 1600 | 93.8% |
| TGIC | 106 | 6.2% |
| Total | 1706 | 100.0% |

Due to the large molecular size of the polyester resin and the small molecular size and spherical shape of TGIC, a about 10% to about 15% stoichiometric surplus of TGIC may be utilized to achieve, for example, a polyester resin/TGIC ratio of 93/7.

The low temperature polyester-TGIC particle composition may include any desired colorant and/or additive. Illustratively, a low temperature polyester-TGIC particle composition may include the following constituents as shown below in Table No. 7.

TABLE NO. 7

Low Temperature Cure Polyester-TGIC Particle Compositions.

| Constituents | Approx. Weight % |
|---|---|
| RUCOTE ® 921 Polyester | 54-63 |
| TGIC | 4-5 |
| Flow Additive | 0.2-3 |
| Degassing Agent | 0.2-5 |
| Colorant | 0.3-40 |
| Filler | 10-30 |

An alternative carboxyl polyester resin curative to TGIC includes, for example, PRIMID® (EMS-Primid, a unit of EMS-Chemie AG). PRIMID® is a beta-hydroxyl alkyl amide curative. However, PRIMID® may require longer cure times than a TGIC-based chemistry, as well as a PRIMID® based coating may appear slightly more orange than a TGIC-based coating. Pinholes and blistering may also be an issue with the use of a PRIMID® based particle where a coating thickness exceeds 4.0 mils.

As mentioned above, a composition, which includes a particle, may include any desired colorant and/or additive. Illustratively, the particle composition may include, for example, a flow additive, a degassing agent, a surfactant or wetting agent, an antioxidant, a heat stabilizer, a ultraviolet light absorber, a wax, a silicone additive, a catalyst, a texturing agent, an electrical charge control agent, an electrical conductivity agent, a processing aid, a filler, and combinations thereof.

Flow additives may be utilized in formulating a particle composition to, for example, reduce or prevent cratering of a finished cured product and/or to improve flow and leveling. Illustratively, the flow additives may be low molecular acrylic polymers, either in liquid form (for example, a liquid containing about 100% active substance), or in solid form (for example, a solid with about 65% active substance). Examples of flow additives include Acronal 4F (about 100% active, BASF), Byk 363 P (about 65% active, BYK-Chemie), RESI-FLOW® P-67 (manufactured by Estron Chemical), RESI-FLOW® PF-67 (about 65% active, Estron Chemical), MODAFLOW™ 3 (about 65% active, Monsanto), and POWDERMATE™ 486 CFL (about 65% active, Troy Corp.). Illustratively, a flow additive may be added to a particle composition in a range of between about 0.3% to about 1% of 100% active flow additive per total formula weight of the particle.

A degassing agent may be added to a particle composition to, for example, aid in the evaporation of volatile products within the composition during the heating and/or curing cycle to reduce and/or prevent pin-holing (volatile bubbles being trapped at the surface boundary between the finish and the air). Some degassing agents, such as Benzoin (Velsicol Chemical Corp.), may solvate the resin/curative mix during the liquid phase of the cure process. Other degassing agents are surfactant-like and other are wax-like and affect the surface tension of the film surface to promote degassing. Illustratively, a particle composition may contain from about 0.2% to about 2% of active degassing agent per total formula weight of the particle. For example, a particle that is curable between about 135° C. and about 149° C. (for example a polyester-PRIMID® chemistry), may contain a combination of about 1% to about 1.8% OXYMELT® A-2 or A-4 (Estron Chemical) and about 0.2% Benzoin per total formula weight of the particle.

A surfactant or wetting agent that may be used in a composition may, for example, promote colorant and/or filler wetting, and/or improve the flow and/or leveling of a finished cured product. In addition, a surfactant or wetting agent may promote substrate wet-out during the cure reaction, which may improve adhesion and/or corrosion resistance. The addition of surfactants may also increase gloss and distinctness of image of the cured film as well. Illustratively, surfactant levels can range from 0.1% to about 0.5% of active substance per total formula weight of the particle. Examples of surfactants or wetting agents include cationic, anionic functional organic compounds, silane, and polysiloxane, including, for example, NUOSPERSE™ 657 (manufactured by Elementis Specialties) and SURFYNOL™ 104 S (Air Products and Chemicals, Inc.).

An antioxidant or heat stabilizer may be used in a particle composition to, for example, inhibit or prevent heat induced yellowing during the curing and/or heating cycle. Illustratively, an antioxidant or heat stabilizer may be used in a white or relatively light colored particle composition in an amount from about 0.2% to about 0.5% of active substance per total formula weight of the particle. More or less antioxidant or heat stabilizer may be used with other colored particles. Examples of antioxidants include Irganox 1076 (Ciba Specialty Chemicals Corp.) and Irganox B-225 Ciba Specialty Chemicals Corp.). An example of a heat stabilizer is Sandostab P-EPQ (Clariant).

An ultraviolet light absorber can be added to a particle composition to, for example, improve ultraviolet resistance (for example, weatherability) of a cured finished product. Used in combination with antioxidants and/or heat stabilizers, the performance of ultraviolet absorbers can be further enhanced.

A wax may be added to a particle composition to, for example, control the gloss and/or flow of a cured composition. A wax may also be used to add texturing to a cured composition. Additionally, some wax additives may improve mar and scratch resistance of a cured composition. Illustratively, a wax from a natural product, such as Carnauba wax, beeswax, hydrocarbon compounds, halogenated hydrocarbons, and PTFE comprise a large percentage of waxes and may be used in the composition and/or particle composition. Examples of wax additives include DT3329-1 (Ciba Geigy), Castor Wax, Powder Tex 61 (Shamrock Technologies, Inc.), Lanco® TF-1778 (available from Noveon Inc.), and Lanco® PP-1362D (available from Noveon, Inc.).

A silicone additive may also be added to a particle composition to improve, for example, mar and scratch resistance of a cured composition. Although not wishing to be held by theory, it is believed that the silicone additives reduce the coefficient of friction that may affect, for example, intercoat adhesion in a two-coat system. Examples of silicone additives include polysiloxane and silicone oil. Catalysts such as 2-Propyl imidazole may be added to a composition to, for example, accelerate cure speed, lower cure temperature, and/or improve physical and/or chemical properties of the cured product. Texturing agents may be added to a composition to, for example, alter and/or manipulate the viscosity of the composition. Electrical charge control additives may be added to a composition to, for example, control transfer efficiency. Examples include TINUVIN® 144 (Ciba Specialty Chemicals), barium titanate, and quaternary ammonium salts. Electrical conductivity additives may be added to a composition to, for example, dissipate electrical charge in the composition and/or finished product. The electrical conductivity additives may be, for example, filler-like, pigment-like, or wax-like in nature. Processing aids may be added to a composition to, for example, facilitate processing of the composition. Processing aids are well known to those skilled in the art.

Colorants may be added to a composition to, for example, obtain a desired color. Illustrative pigments include organic and inorganic pigments, including, for example, titanium dioxide, iron oxide red, iron oxide yellow, iron oxide black, heat stabilized iron oxide, calcinated mixed metal oxide, diarylide, condensated disazo, and phthalo blue. Illustrative colorants and amounts that may be used individually or in combination in the composition are provided below in Table No. 8.

TABLE NO. 8

Pigments.

| Colorant | Approx. Weight % |
| --- | --- |
| Titanium Dioxide | 1-40 |
| Iron Oxide Yellow (C.I. Yellow 14) | 2-20 |
| HR-70 Yellow (Organic Pigment) | 1.5-2 |
| 274-0033 (Organic Pigment) | 0.3-2 |
| RT-172-D (Organic Pigment) | 0.5-5 |
| F5RK-A (Organic Pigment) | 0.5-3.0 |
| 15-1101 AR (Organic Pigment) | 0.5-5 |
| Iron Oxide Black (C.I. Black 11) | 0.5-2 |
| Iron Oxide Red (C.I. Red 101) | 1.5-20 |
| Colortherm C-10 Yellow | 0.05-0.5 |
| Bayferrox 303 T Black | 0.015-0.15 |
| Ultra Marine Blue (C.I. Blue 29) | 15-25 |

Numerous other organic and inorganic colorants known to those skilled in the art may be utilized in the compositions herein described.

A filler may also be added to a particle composition. Two illustrative fillers include calcium carbonate and barium sulfate ($CaCO_3$ and $BaSO_4$, respectively, both manufactured by Fisher Chemicals). The calcium carbonate fillers added to the composition and/or particle compositions may, for example, reduce gloss, as well as the flow of an applied finish at higher concentrations. Wollastonite-type fillers may also be utilized as fillers in the composition and/or particle compositions. Talcum, clay, dolomite, and magnesium-aluminum-silicate in powder form, usually ground to 1-10 microns average particle size, or micron sized glass beads, may also be used as fillers to obtain specific properties, such as, for example, corrosion resistance, gloss control, and/or film texture.

Illustratively, a composition is applied to a surface to achieve a film thickness of about 0.004 mils to about 2.2 mils (about 0.01 microns to about 56 microns) upon curing of the composition.

A particle formulation such as those embracing low temperature cure epoxy chemistry, low temperature cure epoxy-polyester hybrid chemistry, low temperature cure polyester-TGIC chemistry may be prepare in accordance with the following general processing procedure.

Formulation constituents are dry mixed either through low-intensity tumble-mixing or through high-intensity dry-blending performed in a mixer containing a vertical or horizontal mixing shaft with blades rotating at 50-1,000 rpm. Formulations are low-intensity tumble-mixed for about 5 to about 20 minutes, for example, or high-intensity dry-mixed for about 1 to about 5 minutes, for example, depending on batch size. Mixing serves to homogenize the active chemical ingredients and to disperse inert ingredients for enhanced color consistency and to avoid protrusions in applied films. Batch sizes may range from quarts to kiloliters in size. After dry-blending, the temperature of the mixture is maintained at or below about 40° C. to prevent lumping or meltdown.

The mixtures are extruded within minutes to hours after dry-mixing. Single screw extruders with reciprocating screw shaft movements, also called co-kneaders, and twin screw extruders with co-rotating screw shafts are suitable extruders, as well as planetary extruders, counter-rotating twin screw extruders, or single screw extruders. Illustrative extruder size ranges from table-top laboratory models with 10-30 mm screw diameters and 1-5 kg per hour theoretical outputs to production models with 30 to over 300 mm screw diameters and 100 kg to over 2,000 kg per hour theoretical outputs.

The extruders for processing may be heated via water, oil, or electrical heat jacket located on the outside of the extruder barrels. Extruder barrel processing temperatures may range from about 70° C. to about 125° C., though temperatures outside this range may be used to achieve desired properties in some applications. Some extruder barrel heaters utilized in the powder processing may be segmented, in which case, the premix intake zone of the extruder may be run cold or at a minimal heat of about 40° C. to about 50° C. Depending on extruder and screw design, a barrel heat of about 100° C.±15°

C. is adequate for processing highly-reactive, low temperature cure powder coating formulas. The screws may have a helical section in the premix intake area and "paddle" sections for dispersing and melt-mixing the extrudate. Residence time of the extrudate within the extruder typically does not exceed about 60 seconds. The production extruders used for processing the powder coatings are run between about 50 and about 750 rpm screw speed. Screw speeds and extruder barrel temperatures are selected to obtain between about 50% to about 90% torque. Extrudate temperatures range from about 100° C. to about 125° C. as a result of extruder barrel heat and frictional heat from the rotating screws. The extrudate is immediately cooled after exiting the extruder to solidify the material for further processing and to arrest chemical reactions. The extrudate is gravity-fed into counter-rotating chill rolls set about 1.5 to about 3 mm apart. The resulting extrudate sheet is transported on a cooling belt to a flaker or crusher unit where the sheet is broken into flakes under about 1 inch square in size. Cooling belt temperatures from about 5° C. to about 35° C. are maintained during processing. The resulting flakes are milled and characterized using air classifying mills (ACM), cyclones, and sieves, to determine particle size distributions and mean particle sizes. Illustratively, a particle size distribution for a particle ranges from about 90% by volume or more of the particles having a size less than about 100 microns, or less than about 25 microns, or less than about 10 microns, or from about 0.1 to about 50 microns, or from about 1 to about 20 microns, or from about 3 to about 10 microns, or from greater than about 750 nm to about 100 microns, or larger or smaller particle sizes depending on the desired application. All equipment is purged after processing different formulas or colors to avoid chemical or color cross-contamination.

An emulsified composition may be prepared in accordance with the following general processing procedure. In a one-gallon glass container, initially an emulsifier is added to a powder, such as a NATURA™ toner and/or a particle and mixed to thoroughly coat the powder with the emulsifier. Water is then added to the powder and emulsifier mixture and is blended using an IKA-Werke Eurostar power basic mixer at a speed of about 750 rpm for about 4 hours. Additional additives may be added if so desired at any point during preparation of the composition. After the 4 hour blending period, the mixture is further mixed by continuously mixing at room temperature on a magnetic stir/heat plate (Isotemp #409N0063 available from Fisher-Scientific) with a 2-inch magnetic stir bar at 100 rpm for an additional 24 hours. Illustratively, an emulsified composition may include the following constituents as shown below in Table No. 9.

TABLE NO. 9

Emulsified Composition.

| Constituents | Approx. Weight % |
|---|---|
| Water | 70-97 |
| Surfactant | 0.1-5 |
| Powder | 1.1-40 |
| Adhesive | 0-10 |
| Additive | 0.1-5 |

The present disclosure is further illustrated by the following examples, which should not be construed as limiting in any way. Unless otherwise stated, all percentages recited in these examples are weight percents based on total specified composition weight.

EXAMPLES

The particle compositions of examples 1-24 and 44 were prepared using the general processing procedure described above by blending (mixing) and processing the constituents on a 19 mm APV laboratory twin screw extruder (Model No. MP19TC-25, manufactured by Baker Perkins) with co-rotating screws at 100° C. barrel temperature, 400 rpm screw speed, and 50% to 90% torque. The extrudate was cooled on chill rolls that resulted in 3/32 inch (about 3 mm) thick solid extrudate sheets. The sheets were broken into flakes no larger than 1 square inch (6.45 cm$^2$) in size. The flakes were ground on air-cooled jet mills and classified to a particle size range of about 0 microns to about 20 microns. The compositions of examples 25-28 and 33 was prepared using the general processing procedure described above by mixing the particle or toner and emulsifier for a period of time until the particles or toner were coated with the emulsifying agent or agents. Water was then added and thoroughly mixed as described above.

In the particle compositions of Table Nos. 10-25 and 44, the trademark KUKDO® KD-242G (manufactured by Kukdo Chemical Co., LTD.) is a type 3 bisphenol-A epoxy resin with an epoxy equivalent weight of about 700 g/eq. In the particle composition of Table Nos. 10-17, Huntsman Hardener XB 3086 (manufactured by Huntsman Advanced Materials) is a proprietary phenolic curative containing phenol, 4,4'-(1-methylethylidene)bis-, polymer with 2,2'-[(1-methylethylidene)bis(4,1-phenyleneoxymethylene)]bis[oxirane] (commonly described as a polymer of epoxy resin and bisphenol A), a confidential accelerator, and phenol, 4,4'-(1-methylethylidene)bis- (commonly known as bisphenol A). In the particle composition of Table Nos. 19-25 and 44, Actiron NXJ-60 (manufactured by Advanced Technology & Industrial Co.) is a 2-propylimidazole catalyst. In the composition of Table Nos. 10-13, 18-21, and 26-29 and 44, the trademark TI-PURE® TiO$_2$ R-960 (manufactured by E.I. du Pont de Nemours and Company) is a titanium oxide white pigment. In the particle composition of Table Nos. 11-12, 14-15, 19-20, 22-23, 27, and 30-31, Y 10M (CAS. No. 51274-00-1, manufactured by ABCR) is an iron oxide yellow pigment. In the particle composition of Table Nos. 11, 19, and 27-29, 274-0033 (CAS No. 5468-75-7, manufactured by ABCR) is a yellow pigment having the chemical formula of 2,2'-((3,3'-dichloro(1,1'-biphenyl)-4,4'-diyl) bis(azo)) bis(N-(2-M-ethylphenyl)-3-oxobutyramide). In the particle composition of Table Nos. 11, 19, and 27, HR-70 Yellow (manufactured by Clariant) is a yellow organic pigment. In the particle composition of Table No. 44, the trademark COLORTHERM® C-10 Yellow (manufactured by Lanxess Corp.) is an iron oxide yellow pigment. In the particle composition of Table No. 44, the trademark BAYFERROX® 303 T Black (manufactured by Lanxess Corp.) is an iron oxide black pigment. In the particle compositions of Table Nos. 26-33 the trademark RUCOTE® 921 polyester (manufactured by Bayer Material Science, LLC) is a low viscosity carboxyl functional polyester having an acid value of 38 mg KOH/g, a hydroxyl number 6 mg KOH/g, a viscosity of 1800 ICI cone and plate at 200° C./cPs, and a Tg of 60° C.

Example 1

Preparation of a White Low Temperature Cure Epoxy Particle

A white low temperature cure epoxy-based particle having the composition shown in Table No. 10 below was prepared in the manner described above.

TABLE NO. 10

White Low Temperature Cure Epoxy Composition.

| Constituents | (wt %) |
|---|---|
| KD-242G Epoxy | 48 |
| Huntsman Hardener XB 3086 | 10 |
| P-67 | 1 |
| Oxymelt A-2 | 1 |
| $TiO_2$ R-960 | 40 |

Example 2

Preparation of a Yellow Low Temperature Cure Epoxy Particle

A yellow low temperature cure epoxy-based particle having the composition shown in Table No. 11 below was prepared in the manner described above.

TABLE NO. 11

Yellow Low Temperature Cure Epoxy Particle Composition.

| Constituents | (wt %) |
|---|---|
| KD-242G Epoxy | 49 |
| Huntsman Hardener XB 3086 | 11 |
| P-67 | 1 |
| Oxymelt A-2 | 1 |
| $TiO_2$ R-960 | 20 |
| Y 10M Iron Oxide Yellow Pigment | 4 |
| 274-0033 | 2.2 |
| HR-70 Yellow Pigment | 1.8 |
| $BaSO_4$ | 10 |

Example 3

Preparation of a Red Low Temperature Cure Epoxy Particle

A red low temperature cure epoxy-based particle having the composition shown in Table No. 12 below was prepared in the manner described above.

TABLE NO. 12

Red Low Temperature Cure Epoxy Particle Composition.

| Constituents | (wt %) |
|---|---|
| KD-242G Epoxy | 48.5 |
| Huntsman Hardener XB 3086 | 10.3 |
| P-67 | 1 |
| Oxymelt A-2 | 1.04 |
| $TiO_2$ R-960 | 5.13 |
| Y 10M Iron Oxide Yellow Pigment | 0.03 |
| RT-172-D Pigment | 2.5 |
| F5RK-A Pigment | 1.5 |
| $BaSO_4$ | 30 |

Example 4

Preparation of a Blue Low Temperature Cure Epoxy Particle

A blue low temperature cure epoxy-based particle having the composition shown in Table No. 13 below was prepared in the manner described above.

TABLE NO. 13

Blue Low Temperature Cure Epoxy Particle Composition.

| Constituents | (wt %) |
|---|---|
| KD-242G Epoxy | 49.25 |
| Huntsman Hardener XB 3086 | 10.75 |
| P-67 | 1 |
| Oxymelt A-2 | 1.05 |
| $TiO_2$ R-960 | 15. |
| 15-1101 A4R Pigment | 2.5 |
| BK 5099 | 0.45 |
| $BaSO_4$ | 20 |

Example 5

Preparation of a Brown Low Temperature Cure Epoxy Particle

A brown low temperature cure epoxy-based particle having the composition shown in Table No. 14 below was prepared in the manner described above.

TABLE NO. 14

Brown Low Temperature Cure Epoxy Particle Composition.

| Constituents | (wt %) |
|---|---|
| KD-242G Epoxy | 51.67 |
| Huntsman Hardener XB 3086 | 9.13 |
| P-67 | 1 |
| Oxymelt A-2 | 1 |
| $TiO_2$ RCL-6 | 1.18 |
| Y 10M Iron Oxide Yellow Pigment | 2.54 |
| BK 5099 | 2 |
| RO 8097 | 1.48 |
| $BaSO_4$ | 30 |

Example 6

Preparation of an Iron Oxide Yellow Low Temperature Cure Epoxy Particle

An iron oxide yellow low temperature cure epoxy-based particle having the composition shown in Table No. 15 below was prepared in the manner described above.

TABLE NO. 15

Iron Oxide Yellow Low Temperature Cure Epoxy Particle Composition.

| Constituents | (wt %) |
|---|---|
| KD-242G Epoxy | 57.8 |
| Huntsman Hardener XB 3086 | 10.2 |
| P-67 | 1 |
| Oxymelt A-2 | 1 |
| Y 10M Iron Oxide Yellow Pigment | 20 |
| $BaSO_4$ | 10 |

Example 7

Preparation of a Iron Oxide Red Low Temperature Cure Epoxy Particle

An iron oxide red low temperature cure epoxy-based particle having the composition shown in Table No. 16 below was prepared in the manner described above.

TABLE NO. 16

Iron Oxide Red Low Temperature Cure Epoxy Particle Composition.

| Constituents | (wt %) |
|---|---|
| KD-242G Epoxy | 57.8 |
| Huntsman Hardener XB 3086 | 10.2 |
| P-67 | 1 |
| Oxymelt A-2 | 1 |
| RO 8097 | 20 |
| $BaSO_4$ | 10 |

Example 8

Preparation of an Ultra Marine Blue Low Temperature Cure Epoxy Particle

An ultra marine blue low temperature cure epoxy-based particle having the composition shown in Table No. 17 below was prepared in the manner described above.

TABLE NO. 17

Ultra Marine Blue Low Temperature Cure Epoxy Particle Composition.

| Constituents | (wt %) |
|---|---|
| KD-242G Epoxy | 57.8 |
| Huntsman Hardener XB 3086 | 10.2 |
| P-67 | 1 |
| Oxymelt A-2 | 1 |
| UMB-304 | 20 |
| $BaSO_4$ | 10 |

Example 9

Preparation of a White Low Temperature Cure Epoxy-Polyester Hybrid Particle

A white low temperature cure epoxy-polyester hybrid particle having the composition shown in Table No. 18 below was prepared in the manner described above.

TABLE NO. 18

White Low Temperature Cure Epoxy-Polyester Hybrid Particle Composition.

| Constituents | (wt %) |
|---|---|
| KD-242G Epoxy | 28.5 |
| SP 3320 Hybrid Polyester | 29 |
| P-67 | 1 |
| Actiron NXJ-60 | 0.5 |
| Oxymelt A-2 | 1 |
| $TiO_2$ R-960 | 40 |

Example 10

Preparation of a Yellow Low Temperature Cure Epoxy-Polyester Hybrid Particle A yellow low temperature cure epoxy-polyester hybrid particle having the composition shown in Table No. 19 below was prepared in the manner described above.

TABLE NO. 19

Yellow Low Temperature Cure Epoxy-Polyester Hybrid Particle Composition.

| Constituents | (wt %) |
|---|---|
| KD-242G Epoxy | 29.75 |
| SP 3320 Hybrid Polyester | 29.75 |
| P-67 | 1 |
| Actiron NXJ-60 | 0.5 |
| Oxymelt A-2 | 1 |
| $TiO_2$ R-960 | 20 |
| Y 10M Iron Oxide Yellow Pigment | 4 |
| 274-0033 Pigment | 2.2 |
| HR-70 Yellow Pigment | 1.8 |
| $BaSO_4$ | 10 |

Example 11

Preparation of a Red Low Temperature Cure Epoxy-Polyester Hybrid Particle

A red low temperature cure epoxy-polyester hybrid particle having the composition shown in Table No. 20 below was prepared in the manner described above.

TABLE NO. 20

Red Low Temperature Cure Epoxy-Polyester Hybrid Particle Composition.

| Constituents | (wt %) |
|---|---|
| KD-242G Epoxy | 29.15 |
| SP 3320 Hybrid Polyester | 29.15 |
| P-67 | 1 |
| Actiron NXJ-60 | 0.5 |
| Oxymelt A-2 | 1.04 |
| $TiO_2$ R-960 | 5.13 |
| Y 10M Iron Oxide Yellow Pigment | 0.03 |
| RT-172-D Pigment | 2.5 |
| F5RK-A Pigment | 1.5 |
| $BaSO_4$ | 30 |

Example 12

Preparation of a Blue Low Temperature Cure Epoxy-Polyester Hybrid Particle

A blue low temperature cure epoxy-polyester hybrid particle having the composition shown in Table No. 21 below was prepared in the manner described above.

TABLE NO. 21

Blue Low Temperature Cure Epoxy-Polyester Hybrid Particle Composition.

| Constituents | (wt %) |
|---|---|
| KD-242G Epoxy | 29.75 |
| SP 3320 Hybrid Polyester | 29.75 |
| P-67 | 1 |
| Actiron NXJ-60 | 0.5 |
| Oxymelt A-2 | 1.05 |
| $TiO_2$ R-960 | 15 |
| 15-1101 A4R Pigment | 2.5 |
| BK 5099 | 0.45 |
| $BaSO_4$ | 20 |

Example 13

Preparation of a Brown Low Temperature Cure Epoxy-Polyester Hybrid Particle

A brown low temperature cure epoxy-polyester hybrid particle having the composition shown in Table No. 22 below was prepared in the manner described above.

TABLE NO. 22

| Brown Low Temperature Cure Epoxy-Polyester Hybrid Particle Composition. | |
|---|---|
| Constituents | (wt %) |
| KD-242G Epoxy | 30.1 |
| SP 3320 Hybrid Polyester | 30.2 |
| P-67 | 1 |
| Actiron NXJ-60 | 0.5 |
| Oxymelt A-2 | 1 |
| $TiO_2$ RCL-6 | 1.18 |
| Y 10M Iron Oxide Yellow Pigment | 2.54 |
| BK 5099 | 2 |
| RO 8097 | 1.48 |
| $BaSO_4$ | 30 |

Example 14

Preparation of an Iron Oxide Yellow Low Temperature Cure Epoxy-Polyester Hybrid Particle An iron oxide yellow low temperature cure epoxy-polyester hybrid particle having the composition shown in Table No. 23 below was prepared in the manner described above.

TABLE NO. 23

| Iron Oxide Yellow Low Temperature Cure Epoxy-Polyester Hybrid Particle Composition. | |
|---|---|
| Constituents | (wt %) |
| KD-242G Epoxy | 33.75 |
| SP 3320 Hybrid Polyester | 33.75 |
| P-67 | 1 |
| Actiron NXJ-60 | 0.5 |
| Oxymelt A-2 | 1 |
| Y 10M Iron Oxide Yellow Pigment | 20 |
| $BaSO_4$ | 10 |

Example 15

Preparation of an Iron Oxide Red Low Temperature Cure Epoxy-Polyester Hybrid Particle An iron oxide red low temperature cure epoxy-polyester hybrid particle having the composition shown in Table No. 24 below was prepared in the manner described above.

TABLE NO. 24

| Iron Oxide Red Low Temperature Cure Epoxy-Polyester Hybrid Particle Composition. | |
|---|---|
| Constituents | (wt %) |
| KD-242G Epoxy | 33.75 |
| SP 3320 Hybrid Polyester | 33.75 |
| P-67 | 1 |
| Actiron NXJ-60 | 0.5 |
| Oxymelt A-2 | 1 |
| RO 8097 | 20 |
| $BaSO_4$ | 10 |

Example 16

Preparation of an Ultra Marine Blue Low Temperature Cure Epoxy-Polyester Hybrid Particle An ultra marine blue temperature cure epoxy-polyester hybrid particle having the composition shown in Table No. 25 below was prepared in the manner described above.

TABLE NO. 25

| Ultra Marine Blue Low Temperature Cure Epoxy-Polyester Hybrid Particle Composition. | |
|---|---|
| Constituents | (wt %) |
| KD-242G Epoxy | 33.75 |
| SP 3320 Hybrid Polyester | 33.75 |
| P-67 | 1 |
| Actiron NXJ-60 | 0.5 |
| Oxymelt A-2 | 1 |
| UMB-304 | 20 |
| $BaSO_4$ | 10 |

Example 17

Preparation of a White Low Temperature Cure Polyester-TGIC Particle

A white low temperature cure polyester-TGIC particle having the composition shown in Table No. 26 below was prepared in the manner described above.

TABLE NO. 26

| White Low Temperature Cure Polyester-TGIC Particle Composition. | |
|---|---|
| Constituents | (wt %) |
| Rucote 921 Polyester | 54 |
| TGIC | 4 |
| P-67 | 1 |
| Oxymelt A-2 | 1 |
| $TiO_2$ R-960 | 40 |

Example 18

Preparation of a Yellow Low Temperature Cure Polyester-TGIC Particle

A yellow low temperature cure polyester-TGIC particle having the composition shown in Table No. 27 below was prepared in the manner described above.

TABLE NO. 27

Yellow Low Temperature Cure Polyester-TGIC Particle Composition.

| Constituents | (wt %) |
|---|---|
| Rucote 921 Polyester | 55.75 |
| TGIC | 4.25 |
| P-67 | 1 |
| Oxymelt A-2 | 1 |
| TiO$_2$ R-960 | 20 |
| Y 10M Iron Oxide Yellow Pigment | 4 |
| 274-0033 Pigment | 2.2 |
| HR-70 Yellow Pigment | 1.8 |
| BaSO$_4$ | 10 |

Example 19

Preparation of a Red Low Temperature Cure Polyester-TGIC Particle

A red low temperature cure polyester-TGIC particle having the composition shown in Table No. 28 below was prepared in the manner described above.

TABLE NO. 28

Red Low Temperature Cure Polyester-TGIC Particle Composition.

| Constituents | (wt %) |
|---|---|
| Rucote 921 Polyester | 54.6 |
| TGIC | 4.2 |
| P-67 | 1 |
| Oxymelt A-2 | 1.04 |
| TiO$_2$ R-960 | 5.13 |
| 274-0033 Pigment | 0.03 |
| RT-172-D | 2.5 |
| F5RK-A | 1.5 |
| BaSO$_4$ | 30 |

Example 20

Preparation of a Blue Low Temperature Cure Polyester-TGIC Particle

A blue low temperature cure polyester-TGIC particle having the composition shown in Table No. 29 below was prepared in the manner described above.

TABLE NO. 29

Blue Low Temperature Cure Polyester-TGIC Particle Composition.

| Constituents | (wt %) |
|---|---|
| Rucote 921 Polyester | 55.75 |
| TGIC | 4.25 |
| P-67 | 1 |
| Oxymelt A-2 | 1.05 |
| TiO$_2$ R-960 | 15 |
| 274-0033 Pigment | 0.03 |
| 15-1101 A4R Pigment | 2.5 |
| BK 5099 | 0.45 |
| BaSO$_4$ | 20 |

Example 21

Preparation of a Brown Low Temperature Cure Polyester-TGIC Particle

A brown low temperature cure polyester-TGIC particle having the composition shown in Table No. 30 below was prepared in the manner described above.

TABLE NO. 30

Brown Low Temperature Cure Polyester-TGIC Particle Composition.

| Constituents | (wt %) |
|---|---|
| Rucote 921 Polyester | 56.5 |
| TGIC | 4.3 |
| P-67 | 1 |
| Oxymelt A-2 | 1 |
| TiO$_2$ RCL-6 | 1.18 |
| Y 10M Iron Oxide Yellow Pigment | 2.54 |
| BK 5099 | 2 |
| RO 8097 | 1.48 |
| BaSO$_4$ | 30 |

Example 22

Preparation of an Iron Oxide Yellow Low Temperature Cure Polyester-TGIC Particle An iron oxide yellow low temperature cure polyester-TGIC particle having the composition shown in Table No. 31 below was prepared in the manner described above.

TABLE NO. 31

Iron Oxide Yellow Low Temperature Cure Polyester-TGIC Particle Composition.

| Constituents | (wt %) |
|---|---|
| Rucote 921 Polyester | 63.3 |
| TGIC | 4.7 |
| P-67 | 1 |
| Oxymelt A-2 | 1 |
| Y 10M Iron Oxide Yellow Pigment | 20 |
| BaSO$_4$ | 10 |

Example 23

Preparation of an Iron Oxide Red Low Temperature Cure Polyester-TGIC Particle An iron oxide red low temperature cure polyester-TGIC particle having the composition shown in Table No. 32 below was prepared in the manner described above.

TABLE NO. 32

Iron Oxide Red Low Temperature Cure Polyester-TGIC Particle Composition.

| Constituents | (wt %) |
|---|---|
| Rucote 921 Polyester | 63.3 |
| TGIC | 4.7 |
| P-67 | 1 |
| Oxymelt A-2 | 1 |

TABLE NO. 32-continued

Iron Oxide Red Low Temperature Cure Polyester-TGIC Particle Composition.

| Constituents | (wt %) |
|---|---|
| RO 8097 | 20 |
| BaSO₄ | 10 |

Example 24

Preparation of a Ultra Marine Blue Low Temperature Cure Polyester-TGIC Particle

An ultra marine blue temperature cure polyester-TGIC particle having the composition shown in Table No. 33 below was prepared in the manner described above.

TABLE NO. 33

Ultra Marine Blue Low Temperature Cure Polyester-TGIC Particle Composition.

| Constituents | (wt %) |
|---|---|
| Rucote 921 Polyester | 63.3 |
| TGIC | 4.7 |
| P-67 | 1 |
| Oxymelt A-2 | 1 |
| UMB-304 | 20 |
| BaSO₄ | 10 |

Example 25

Preparation of a Blue Low Temperature Cure Epoxy Composition

A blue low temperature cure epoxy-based composition having the composition shown in Table No. 34 below was prepared in the manner described above.

TABLE NO. 34

Blue Low Temperature Cure Epoxy Composition.

| Constituents | (wt %) |
|---|---|
| Water | 96.85 |
| ALCOPRINT ™ PTU | 0.15 |
| Composition of Table No. n13 | 3 |

Example 26

Preparation of a Blue Low Temperature Cure Epoxy-Polyester Hybrid Composition

A blue low temperature cure epoxy-polyester hybrid composition having the composition shown in Table No. 35 below was prepared in the manner described above.

TABLE NO. 35

Blue Low Temperature Cure Epoxy-Polyester Hybrid Composition.

| Constituents | (wt %) |
|---|---|
| Water | 96.85 |
| ALCOPRINT ™ PTU | 0.15 |
| Composition of Table No. 21 | 3 |

Example 27

Preparation of a Blue Low Temperature Cure Polyester-TGIC Composition

A blue low temperature cure polyester-TGIC composition having the composition shown in Table No. 37 below was prepared in the manner described above.

TABLE NO. 36

Blue Low Temperature Cure Polyester-TGIC Composition.

| Constituents | (wt %) |
|---|---|
| Water | 96.85 |
| ALCOPRINT ™ PTU | 0.15 |
| Composition of Table No. 29 | 3 |

Example 28

Preparation of a Blue Low Temperature Cure NATURA® Based Composition

A blue low temperature cure NATURA® based composition having the composition of shown in Table No. 38 below, was prepared in the manner described above. Blue (cyan) NATURA® toner and clear NATURA® toner from Sawgrass Technologies, Inc. were purchased from ACP Technologies (I.D. Nos. 127 and 131, respectively).

TABLE NO. 37

Blue Low Temperature NATURA ® Based Composition.

| Constituents | (wt %) |
|---|---|
| Water | 96.85 |
| ALCOPRINT ™ PTU | 0.15 |
| Blue NATURA ® Toner | 1.5 |
| Clear NATURA ® Toner | 1.5 |

Example 29

Preparation of a Brown Low Temperature Cure Epoxy-Polyester Hybrid

A brown low temperature cure epoxy-polyester hybrid composition having the composition shown in Table No. 36 below was prepared in the manner described above.

TABLE NO. 38

Brown Low Temperature Cure Epoxy-Polyester Hybrid Composition.

| Constituents | (wt %) |
|---|---|
| Water | 96.85 |
| ALCOPRINT ™ PTU | 0.15 |
| Composition of Table No. 22 | 3 |

Example 30

Application, Affixation Reversibility and Durability of the Compositions of Examples 25-28 on a Soft Surface Composition of the present disclosure were tested for the ability to be applied to a nylon test carpet, removal (reversibility) from the nylon test carpet prior to an affixation step, affixation to the nylon test carpet using heat as the energy source, and durability after affixation to the nylon test carpet.

The four individual compositions of Examples 25-28 were thoroughly mixed and individually placed into 8 oz. PET bottles with finger pump fine mist sprayers having an output of 60 micron particle size (N2862524410WHT3, bottle neck-24/410; available from ebottles.com, Inc.). Four two-foot by two-foot pieces of nylon test carpet were vacuumed using a Bissell CLEANVIEW® II vacuum cleaner manufactured by Bissell Homecare, Inc. to remove loose fibers and dirt. The specifications of the nylon test carpet utilized are indicated in Table 39.

TABLE 39

Nylon Test Carpet and Polyester Test Carpet Specifications.

|  | Nylon Test Carpet | Polyester Test Carpet |
| --- | --- | --- |
| Style | 7522 Favored One | SP501 |
| Manufacturer | Mohawk Industries | Mohawk Industries |
| Pile Yarn Content | Filament 100% Nylon | Spun 100% Polyester |
| Yarn Twists per inch | 4.25 × 4.25 | 5.0 × 4.8 |
| Fabric Type | Cut Pile | Cut Pile |
| Fiber Treatment | Ultrastrand with soil & stain | Mohawk APP Polyester W/SGC |
| Gauge | 5/32 | 1/8 C |
| Pile Height | 0.485 | 0.440 |
| Stitches per inch | 7.83 | 8.50 |
| Certified Pile Weight | 25.20 oz. | 39.50 oz. |
| Total Weight | 56.29 oz. | 71.03 oz. |
| Density | 1871 | 3232 |
| Dye Method | Fluidye | Beck |
| Primary Backing | Woven Polypropylene | Woven Polypropylene |
| Secondary Backing | Woven Polypropylene | Woven Polypropylene |
| Performance Appearance Retention Rating | 3.50 | 3.25 |

For each of the four pieces of nylon test carpet, the baseline color of each of three spots over which a respective composition was applied was determined using a Minolta data processor model No. DP-301 combined with a Minolta model No. CR-310 chroma meter (both manufactured by Konica Minolta Sensing Americas, Inc.) that was set to the "L-a-b" setting to record $\Delta E$ (color change) and calibrated according to the manufacturer's instructions.

The following tests were performed separately for each of the four compositions of Examples 25-28. Prior to application of the composition, a stencil made of a disposable absorbent material available from Kimberly-Clark Corp. with a nylon mesh backing was centered on the surface of the nylon test carpet sample. Subsequently, the composition was applied as a gentle mist to the nylon test carpet from the finger sprayer at a distance of 8-10 inches from the nylon test carpet and at a rate to saturate the top surface of the nylon test carpet. The applied composition was allowed to dry overnight at ambient temperature and humidity on the nylon test carpet. Once dried one half of the applied composition pattern was removed from the nylon test carpet using a Shop-Vac® 1×1 (wet/dry vacuum with hose attachment (1¼ inch diameter×4 feet). The vacuum characteristics include 1 peak horsepower, 115 cubic feet/minute of air flow, 52 inches of sealed pressure, and electrical ratings of 120 V, 60 Hz, and 5.5 A. The pattern was vacuumed twenty times in one direction and then twenty times in the opposite direction over the same area. Once vacuumed, L-a-b measurements were taken from the vacuumed areas of the nylon test carpet with the Minolta data processor and Minolta chroma meter.

The un-vacuumed composition pattern was subsequently affixed on the nylon test carpet by placing an absorbent paper towel (WYPALL® X60 reinforced wipes from Kimberly-Clark Corp.) over the composition pattern and heating the composition pattern using a household iron (Hamilton-Beach Model #14340) set at the highest setting (cotton). Heat was applied through the absorbent paper towel in a circular motion for 2½ minutes per square ft of composition. Subsequently, the paper towel was removed from the nylon test carpet and L-a-b values were measured on the affixed composition pattern using the Minolta data processor and Minolta chroma meter specified above.

To determine the resilience of the affixed composition on the nylon test carpet, one half of the affixed composition was vacuumed twenty times (using a back and forth motion) with a Shop-Vac®E 1×1® wet/dry vacuum with hose attachment. The L-a-b values of the vacuumed and affixed versus the affixed-only (unvacuumed) areas were taken using Minolta data processor combined with a Minolta chroma meter as mentioned above.

Reversibility, affixation, and durability of the compositions of Examples 25-28 are shown below in Table Nos. 40-43.

TABLE NO. 40

Reversibility, Affixation, and Durability of the Blue Low Temperature Cure Epoxy Composition of Example 25.

|  | L | a | b | $\Delta E$ |
| --- | --- | --- | --- | --- |
| Initial | 55.54 | 4.72 | 11.28 | — |
| Application | 45.53 | 4.83 | −15.43 | 28.52 |
| Reversibility | 51.48 | 4.64 | 9.94 | 4.28 |
| Affixation | 39.11 | 2.51 | −7.66 | 25.17 |
| Durability (vacuumed) | 41.89 | 1.99 | −6.38 | 22.49 |
| Durability (not vacuumed) | 37.09 | 2.55 | −8.66 | 27.25 |

TABLE NO. 41

Reversibility, Affixation, and Durability of the Blue Low Temperature Cure Epoxy-Polyester Hybrid Composition of Example 26.

|  | L | a | b | $\Delta E$ |
| --- | --- | --- | --- | --- |
| Initial | 53.05 | 5.01 | 11.52 | — |
| Application | 47.00 | 4.19 | −4.35 | 17.00 |
| Reversibility | 50.63 | 4.99 | 10.52 | 2.62 |
| Affixation | 44.01 | 3.31 | 0.39 | 14.44 |
| Durability (vacuumed) | 45.73 | 3.11 | 0.70 | 13.20 |
| Durability (not vacuumed) | 42.72 | 3.67 | −0.20 | 15.68 |

TABLE NO. 42

Reversibility, Affixation, and Durability of the Blue Low Temperature Cure Polyester-TGIC Composition of Example 27.

|  | L | a | b | $\Delta E$ |
| --- | --- | --- | --- | --- |
| Initial | 54.85 | 4.78 | 11.23 | — |
| Application | 47.17 | 4.47 | −10.84 | 23.37 |
| Reversibility | 51.47 | 4.78 | 10.48 | 3.46 |
| Affixation | 43.19 | 3.37 | −7.45 | 22.07 |
| Durability (vacuumed) | 42.06 | 3.27 | −6.38 | 21.82 |
| Durability (not vacuumed) | 42.51 | 3.50 | −5.60 | 20.91 |

TABLE NO. 43

Reversibility, Affixation, and Durability of the Blue Low Temperature NATURA ® Based Composition of Example 28.

|  | L | a | b | ΔE |
|---|---|---|---|---|
| Initial | 54.95 | 4.79 | 11.31 | — |
| Application | 42.72 | 1.58 | −11.09 | 25.72 |
| Reversibility | 50.89 | 4.70 | 11.37 | 4.06 |
| Affixation | 38.45 | −3.01 | −10.75 | 28.63 |
| Durability (vacuumed) | 37.05 | −2.80 | −8.62 | 27.84 |
| Durability (not vacuumed) | 38.23 | −2.63 | −10.17 | 28.21 |

Example 31

Determination of Glass Transition Temperatures (Tg) and Melting Temperatures (Tm) of Surface Substrates Tg and Tm of surface substrates were measured using a Model Q100 Differential Scanning Calorimeter (TA Instruments, Inc.) at a heating rate of 20° C./min. Specifically, in this way, the nylon carpet of Table No. 39 was measured to have a Tg of 40-45° C. and a Tm of 257° C. Further, a polyester carpet of Table No. 38 was measured to have a Tg of 140-150° C. and a Tm of 247° C.

Example 32

Preparation of a Beige Low Temperature Cure Epoxy-Polyester Hybrid Particle

A beige low temperature cure epoxy-polyester hybrid particle having the composition shown in Table No. 44 below was prepared in the manner described above.

TABLE NO. 44

Beige Low Temperature Cure Epoxy-Polyester Hybrid Particle Composition.

| Constituents | (wt %) |
|---|---|
| KD-242G Epoxy | 28.0 |
| SP 3320 Hybrid Polyester | 28.0 |
| P-67 | 1 |
| Actiron NXJ-60 | 0.415 |
| Oxymelt A-2 | 2.4 |
| TiO$_2$ R-960 | 40 |
| COLORTHERM ® C-10 Yellow | 0.12 |
| BAYFERROX ® 303 T Black | 0.065 |

Example 33

Preparation of a Beige Low Temperature Cure Epoxy-Polyester Hybrid

A beige low temperature cure epoxy-polyester hybrid composition having the composition shown in Table No. 45 below was prepared in the manner described above.

TABLE NO. 45

Brown Low Temperature Cure Epoxy-Polyester Hybrid Composition.

| Constituents | (wt %) |
|---|---|
| Water | 96.85 |
| ALCOPRINT ™ PTU | 0.15 |
| Composition of Table No. 44 | 3 |

Example 34

Stain Removal and Stain Masking Characteristics for a Beige Carpet

Stain removal and stain masking characteristics of the epoxy-polyester hybrid chemistry described above in Example 33 (hereinafter referred to as "the B2A composition") were determined as follows. Stain removal and stain masking were determined for red wine, coffee, and spaghetti stains on a nylon test carpet and a polyester test carpet (as described in Table 39) by determining ΔE values as previously described of: 1) virgin, unstained nylon and polyester test carpet; 2) after a stain was applied and allowed to dry until only damp to touch; 3) after the B2A composition was applied (as described above in Example 30) to the surfaces of the nylon and polyester test carpets to cover the stain, allowed to dry on the stain, and then removed by a vacuuming process that included vacuuming the B2A composition twenty times in one direction and then twenty times in the opposite direction over the same area using a SHOP-VAC® 1×1 portable wet/dry vacuum (12 V, 60 Hz, 5.5 A, Model No. 2101A, manufactured by Shop-Vac, Inc.); and 4) after the B2A composition was reapplied to the stain and subsequently affixed on the nylon and polyester test carpets by placing an absorbent paper towel (WYPALL® X60 reinforced wipes from Kimberly-Clark Corp.) over the B2A composition pattern and heating the B2A composition pattern using a household iron (Hamilton-Beach Model No. 14340) set at the highest setting (cotton). Heat was applied through the absorbent paper towel in a circular motion for 2½ minutes per square foot of the B2A composition pattern. The results of the stain removal and stain masking tests are provided below in Table Nos. 46-51.

TABLE NO. 46

Stain Removal and Stain Masking of Red Wine on Nylon Test Carpet.

|  | L | a | b | ΔE |
|---|---|---|---|---|
| Unstained | 68.42 | 4.68 | 10.71 | — |
| Wine stain | 56.38 | 11.56 | 13.45 | 14.14 |
| "B2A" applied, dried, & vacuumed | 64.46 | 8.51 | 8.60 | 5.90 |
| "B2A" reapplied, dried, & affixed | 68.22 | 6.37 | 11.37 | 1.83 |

TABLE NO. 47

Stain Removal and Stain Masking of Coffee on Nylon Test Carpet.

|  | L | a | b | ΔE |
|---|---|---|---|---|
| Unstained | 69.28 | 4.57 | 10.72 | — |
| Coffee stain | 59.30 | 6.44 | 17.88 | 12.42 |
| "B2A" applied, dried, & vacuumed | 69.62 | 4.43 | 12.17 | 1.50 |
| "B2A" reapplied, dried, & affixed | 69.82 | 3.73 | 13.18 | 2.65 |

TABLE NO. 48

Stain Removal and Stain Masking of Spaghetti on Nylon Test Carpet.

|  | L | a | b | ΔE |
|---|---|---|---|---|
| Unstained | 68.30 | 4.63 | 11.12 | — |
| Spaghetti stain | 66.58 | 4.85 | 21.24 | 10.27 |
| "B2A" applied, dried, & vacuumed | 71.70 | 3.95 | 11.19 | 3.47 |
| "B2A" reapplied, dried, & affixed | 69.28 | 4.43 | 16.66 | 5.63 |

TABLE NO. 49

Stain Removal and Stain Masking of Red Wine on Polyester Test Carpet.

|  | L | a | b | ΔE |
|---|---|---|---|---|
| Unstained | 63.59 | 4.66 | 10.33 | — |
| Wine stain | 49.96 | 11.34 | 14.03 | 15.62 |
| "B2A" applied, dried, & vacuumed | 61.69 | 5.48 | 11.10 | 2.21 |
| "B2A" reapplied, dried, & affixed | 63.51 | 5.13 | 12.32 | 2.05 |

TABLE NO. 50

Stain Removal and Stain Masking of Coffee on Polyester Test Carpet.

|  | L | a | b | ΔE |
|---|---|---|---|---|
| Unstained | 63.45 | 4.65 | 10.13 | — |
| Coffee stain | 53.12 | 7.00 | 16.16 | 12.19 |
| "B2A" applied, dried, & vacuumed | 62.45 | 4.67 | 10.75 | 1.18 |
| "B2A" reapplied, dried, & affixed | 68.41 | 3.39 | 10.20 | 5.12 |

TABLE NO. 51

Stain Removal and Stain Masking of Spaghetti on Polyester Test Carpet.

|  | L | a | b | ΔE |
|---|---|---|---|---|
| Unstained | 63.26 | 4.56 | 9.94 | — |
| Spaghetti stain | 62.56 | 5.10 | 20.89 | 10.99 |
| "B2A" applied, dried, & vacuumed | 63.99 | 4.45 | 10.18 | 0.78 |
| "B2A" reapplied, dried, & affixed | 66.75 | 3.72 | 10.74 | 3.68 |

INDUSTRIAL APPLICATION

The method disclosed herein allows for the application of a composition to be applied to a surface, and more specifically a soft surface such as a carpet, a rug, draperies, curtains, upholstery, and the like to remove and/or mask a stain on the surface. By applying the composition to the surface, perceived aesthetic quality of the surface is improved and may extend the useful life of the soft surface before need for replacement.

The disclosure has been presented in an illustrative manner in order to enable a person of ordinary skill in the art to make and use the disclosure, and the terminology used is intended to be in the nature of description rather than of limitation. It is understood that the disclosure may be practiced in ways other than as specifically disclosed, and that all modifications, equivalents, and variations of the present disclosure, which are possible in light of the above teachings and ascertainable to a person of ordinary skill in the art, are specifically included within the scope of the impending claims. All patents, patent publications, and other references cited herein are incorporated herein by reference in their entirety.

What is claimed is:

1. A method of neutralizing a stain on a surface, the method comprising:
    applying a first effective amount of a composition to a stain on a selected surface to affect a color change thereon, the composition comprising a liquid carrier and particles, the particles comprising a homogeneous mixture of a first additive and at least one polymer selected from the group consisting of a polyolefin, a polyurethane, an acrylic, an acrylate, a polyamine, a polyamide, a polyamid, a polyimide, a polyether, a polystyrene, a polycarbonate, polysulfone, a polyester, a polyalkyleneoxide, a polysiloxane, a polysulfide, a polyethyleneimine, a cellulose, a wax, a paraffin, a phenolic, an elastomer, a vinyl, a hot melt adhesive, a hydrophilic polycarbodiimide, a polysaccharide aldehyde derivative, a bismaleimides, a silicon, a soya oil, a linseed oil modified alkyd, a copolymer, a homopolymer, and mixtures thereof;
    allowing the composition to substantially dry on the surface to attach the particles to the surface;
    neutralizing the stain on the surface by removing the attached particles from the surface;
    after removing the attached particles from the surface, visually determining if a residual stain material remains on the surface; and
    when the residual stain material remains on the surface, masking the residual stain material on the surface by applying a second effective amount of the composition to the residual stain material and applying heat or a chemical to the second effective amount of the composition to durably affix the composition to the surface.

2. The method of claim 1, wherein the applying heat or the chemical to the substantially dry particles creates a film greater than about 0.1 micron in thickness on the surface.

3. The method of claim 1, wherein the at least one polymer has a melting point of about 260° C. or less.

4. The method of claim 1, Wherein the composition further comprises a second additive.

5. The method of claim 4, wherein at least one of the first additive or second additive independently comprises at least one of a curative, an accelerant, a stabilizer, an induction agent, a susceptor, a magnetic responsive agent, a metallic particle, an anti-wicking agent, a thickening agent, an adhesive, a binder, a surfactant, a lubricant, a viscosity modifier, a humectant, a propellant, an inorganic particulate material, a detergent, a soap, a bleaching agent, a colorant, a fragrance, a bioactive agent, or a pH adjusting agent.

6. The method of claim 5, wherein the first additive is a colorant.

7. The method of claim 1, wherein the composition further comprises particles of which about 90% by volume or more have a size between about 1 micron to about 100 microns.

8. The method of claim 1, wherein the polymer has an average molecular weight of 3,000-500,000 and a glass transition temperature of about 45° C. to about 75° C.

9. The method of claim 1, wherein the acrylic is selected from the group consisting of styrene-acrylate, poly(meth) acrylic acid polystyrene-acrylate, cyanoacrylate, poly(meth) acrylate, polyacrylic acid derivatives, ethylene-acrylic acid copolymer, and polyacrylamide.

10. The method of claim 1, wherein homogeneous mixture further comprises a filler.

11. The method of claim 1, wherein the composition further comprises a propellant.

12. The method of claim 1 further comprising the step of placing a consumer aid on the surface prior to applying the composition to preview how the surface will appear after application of the composition.

13. A method of masking a surface, the method comprising:
- applying a first effective amount of a composition to a selected surface to mask an area thereon, the composition comprising a liquid carrier and at least one particle comprising a homogeneous mixture of a first additive and at least one polymer selected from the group consisting of a polyolefin, a polyurethane, an acrylic, an acrylate, polyamine, a polyamide, a polyamid, a polyimide, a polyether, a polystyrene, a polycarbonate, a polysulfone, a polyester, a polyalkyleneoxide, a polysiloxane, a polysulfide, a polyethyleneimine, a cellulose, a wax, a paraffin, a phenolic, an elastomer, a vinyl, a hot melt adhesive, a hydrophilic polycarbodiimide, a polysaccharide aldehyde, derivative, a bismaleimides, a silicon, a soya oil, a linseed oil modified alkyd, a copolymer, a homopolymer, and mixtures thereof, and optionally at least one of a curative or an accelerant;
- allowing the composition to substantially dry on the surface to form particulates greater than about 1 micron in size attached to the surface; and
- masking the surface by applying heat or a chemical to the particulates to durably affix the particulates to the surface.

14. A method of neutralizing a stain on a surface, the method comprising:
- applying an effective amount of a composition comprising a water-based carrier and a particle comprising a homogeneous mixture of a colorant and at least one polymer selected from the group consisting of a polyolefin, a polyurethane, an acrylic, an acrylate, a polyamine, a polyamide, polyamid, polyimide, a polyether, a polystyrene, a polycarbonate, a polysulfone, a polyester, a polyalkyleneoxide, a polysiloxane, a polysulfide, a polyethyleneimine, a cellulose, a wax, a paraffin, a phenolic, an elastomer, a vinyl, a hot melt adhesive, a hydrophilic polycarbodiimide, a polysaccharide aldehyde derivative, a bismaleimides, a silicon, a soya oil, a linseed oil modified alkyd, a copolymer, a homopolymer, and mixtures thereof to a selected surface having a stain associated therewith to affect a color change thereon, the composition formulated to: 1) form substantially dry homogeneous particles greater than about 1 micron in size upon substantial removal of the water-based carrier, 2) neutralize the stain on the surface by substantially removing the substantially dry homogeneous particles from the surface, and 3) neutralize the stain on the surface by applying heat or a chemical to the substantially dry homogeneous particles to substantially affix the particles to the surface; and
- neutralizing the stain on the surface by substantially removing the substantially dry homogeneous particles from the surface or applying heat or a chemical to the substantially dry homogeneous particles to durably affix the substantially dry homogeneous particles to the surface.

15. A method of imparting a color change on a surface, the method comprising:
- applying an effective amount of a composition to a surface to affect the color change thereon, the composition comprising a liquid carrier and particles comprising a homogenous mixture of a colorant and at least one polymer;
- allowing the composition to substantially dry on the surface to adhere the particles to the surface; and
- deciding whether to keep the color change on the surface and applying heat or a chemical to the particles to durably affix the particles to the surface if it is decided that the color change will be kept on the surface,
- wherein the composition is formulated to allow substantial removal of the particles from the surface by vacuuming when it is decided not to keep the color change on the surface.

16. The method of claim 15, wherein the composition further comprises a temporary adhesive.

* * * * *

UNITED STATES PATENT AND TRADEMARK OFFICE
CERTIFICATE OF CORRECTION

| | | |
|---|---|---|
| PATENT NO. | : 7,947,640 B2 | Page 1 of 1 |
| APPLICATION NO. | : 11/799805 | |
| DATED | : May 24, 2011 | |
| INVENTOR(S) | : Ketan N. Shah et al. | |

It is certified that error appears in the above-identified patent and that said Letters Patent is hereby corrected as shown below:

Column 46, Line 65: replace "acid" with --acid,--

Column 47, Line 17: insert --a-- before "polyamine"

Column 47, Line 23: replace "aldehyde, derivative" with --aldehyde derivative--

Column 47, Line 41: insert --a-- before "polyamid"

Column 47, Line 41: insert --a-- before "polyimine"

Signed and Sealed this
Thirteenth Day of September, 2011

David J. Kappos
*Director of the United States Patent and Trademark Office*